(12) United States Patent
Yoshida et al.

(10) Patent No.: US 9,002,705 B2
(45) Date of Patent: Apr. 7, 2015

(54) INTERACTIVE DEVICE THAT RECOGNIZES INPUT VOICE OF A USER AND CONTENTS OF AN UTTERANCE OF THE USER, AND PERFORMS A RESPONSE CORRESPONDING TO THE RECOGNIZED CONTENTS

(75) Inventors: Yuichi Yoshida, Wako (JP); Taku Osada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 13/450,515

(22) Filed: Apr. 19, 2012

(65) Prior Publication Data

US 2012/0271633 A1 Oct. 25, 2012

(30) Foreign Application Priority Data

Apr. 19, 2011 (JP) ................................. 2011-092683

(51) Int. Cl.
*G10L 17/00* (2013.01)
*G10L 15/22* (2006.01)
*G10L 15/26* (2006.01)
*G06F 17/27* (2006.01)

(52) U.S. Cl.
CPC .............. *G10L 15/22* (2013.01); *G10L 15/265* (2013.01); *G06F 17/2785* (2013.01); *G10L 2015/223* (2013.01)

(58) Field of Classification Search
CPC ....... G10L 15/265; G10L 15/30; G10L 15/22; G10L 17/005; G10L 15/063; G10L 15/183
USPC ............. 704/275, 246, 251, 255, 9, 231, 243, 704/257, 270, 244, 270.1; 379/88.01, 379/88.03, 88.04
See application file for complete search history.

(56) References Cited

U.S. PATENT DOCUMENTS

| | | | | |
|---|---|---|---|---|
| 2008/0167872 A1* | 7/2008 | Okimoto et al. | ............... | 704/251 |
| 2008/0228494 A1* | 9/2008 | Cross | ............................ | 704/275 |
| 2009/0248411 A1* | 10/2009 | Konchitsky et al. | .......... | 704/242 |
| 2010/0070268 A1* | 3/2010 | Sung | ............................. | 704/203 |

FOREIGN PATENT DOCUMENTS

| | | |
|---|---|---|
| JP | 06-259090 | 9/1994 |
| JP | 8-263092 | 10/1996 |
| JP | 2010-224153 | 10/2010 |

OTHER PUBLICATIONS

Japanese Office Action dated Sep. 30, 2014, Application No. 2011-092683, 3 pages.

* cited by examiner

*Primary Examiner* — Vijay B Chawan
(74) *Attorney, Agent, or Firm* — Rankin, Hill & Clark LLP

(57) ABSTRACT

The present invention provides an interactive device which allows quick utterance recognition results and sequential output thereof and which diminishes a recognition rate decrease even if user's utterance is divided by a short interval into frames for quick decision. The interactive device: sets a recognition section for voice recognition; performs voice recognition for the recognition section; when the voice recognition includes a key phrase, determines response actions corresponding thereto; and executes the response actions. The interactive device repeatedly updates the set recognition terminal point to a frame which is the predetermined time length ahead of the set recognition terminal point to set a plurality of recognition sections. The interactive device performs voice recognition for each recognition section.

8 Claims, 16 Drawing Sheets

FIG. 4A [Example of utterance of a user]

"kaigan (beach) ni wa (on) donna (what) gomi ga (litter) aru no (is there)." ("What litter is there on the beach?")

*Underlined words are a key phrase for determining response action. Here, "ga" in "gomi ga (litter)" in Japanese is a particle that follows the subject.

FIG. 4B [Example of setting of recognition sections]

FIG. 4C [Example of recognition results produced from the example of utterance of the user]

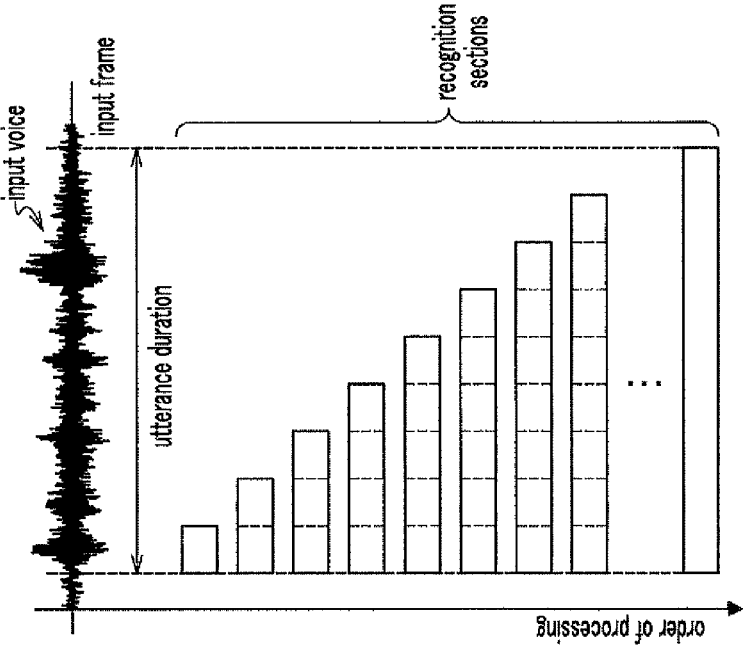

| number of frames constituting recognition section | recognition result |
|---|---|
| 20 | "ah" "," |
| 40 | "hai" "ka" "," |
| 60 | "kaigan" "ni" "," |
| 80 | "kaigan" "ni" "wa" "dou" |
| 100 | "kaigan" "ni" "wa" "donna" "," |
| 120 | "kaigan" "ni" "wa" "donna" "gomi" "," |
| 140 | "kaigan" "ni" "wa" "donna" "gomi" "ga" "," |
| 160 | "kaigan" "ni" "wa" "donna" "gomi" "ga" "aru" "no" "," |
| ... | ... |
| 232 | "kaigan" "ni" "wa" "donna" "gomi" "ga" "aru" "no" "," |

FIG.5

| response action | key phrase |
|---|---|
| TYPE | "donna (what)" "gomi (litter)" |
| AMOUNT | "dono" "kurai"* "gomi (litter)" |
| ... | ... |
| PARTICIPATE | "dou (how)" "sanka (participate)" |
| SCHEDULE | "kondo (this time)" "doko (where)" |
| ... | ... |

* Here, in combination, "dono" and "kurai" in Japanese means "how much" in English.

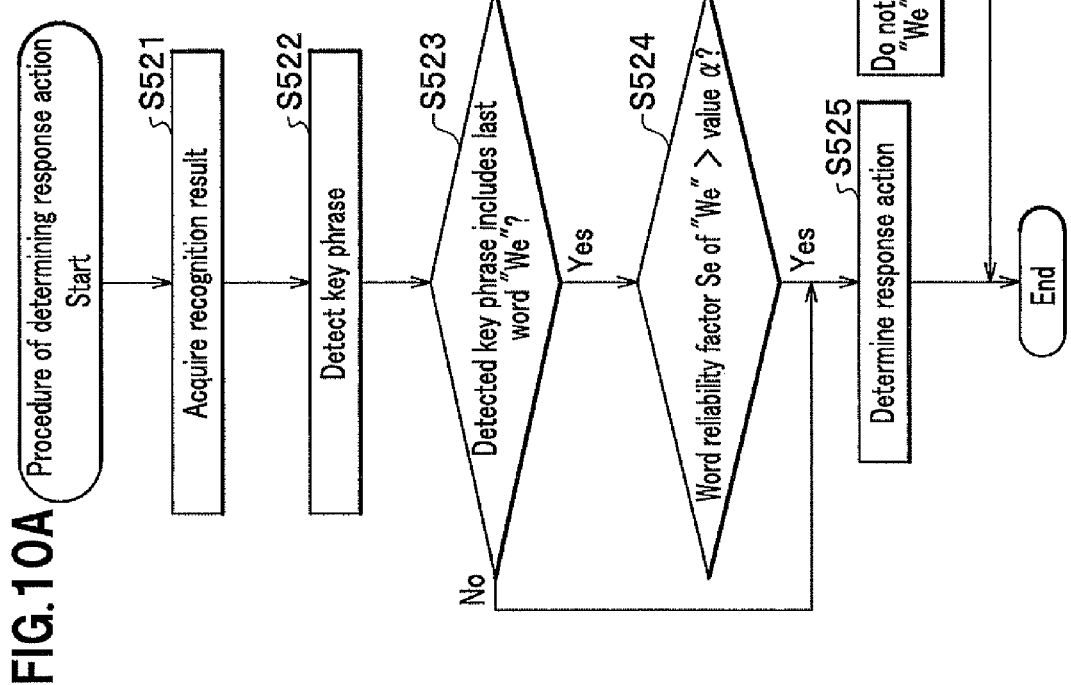

FIG.14

| response action category | response action | key phrase |
|---|---|---|
| REFUSAL | TYPE | "donna (what)" "gomi (litter)" |
| | AMOUNT | "dono" "kurai" * "gomi (litter)" |
| | ... | ... |
| BEACH CLEANUP | PARTICIPATE | "dou (how)" "sanka (participate)" |
| | SCHEDULE | "kondo (this time)" "doko (where)" |
| | ... | ... |

* Here, in combination, "dono" and "kurai" in Japanese means "how much" in English.

FIG.15A

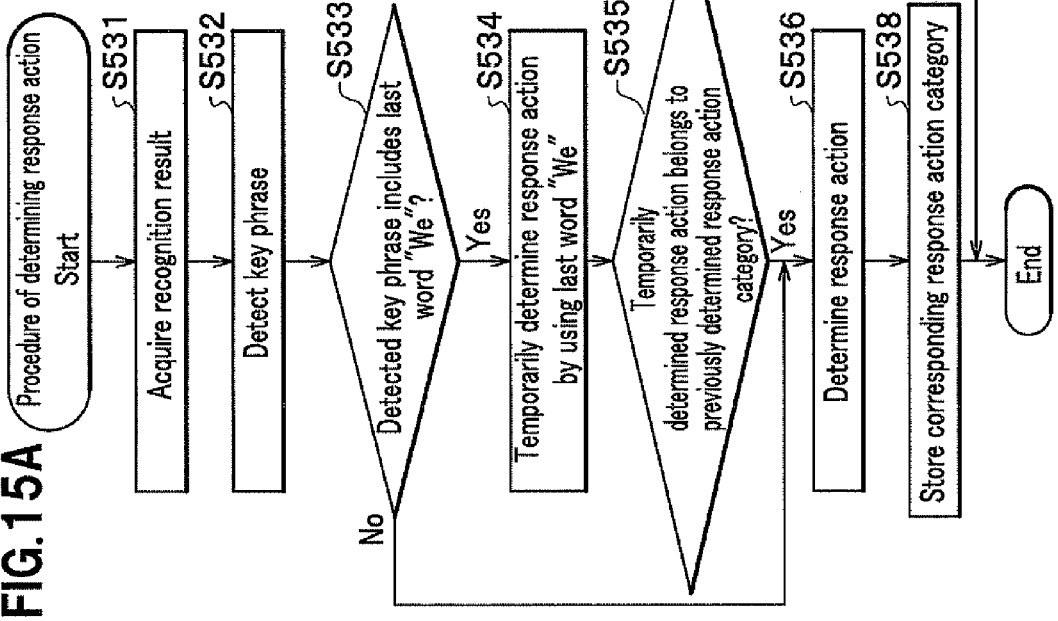

Procedure of determining response action

Start → S531 Acquire recognition result → S532 Detect key phrase → S533 Detected key phrase includes last word "We"?
- No → End
- Yes → S534 Temporarily determine response action by using last word "We" → S535 Temporarily determined response action belongs to previously determined response action category?
  - Yes → S536 Determine response action → S538 Store corresponding response action category → End
  - No → S537 Do not regard last word "We" as key phrase → S536

FIG.15B

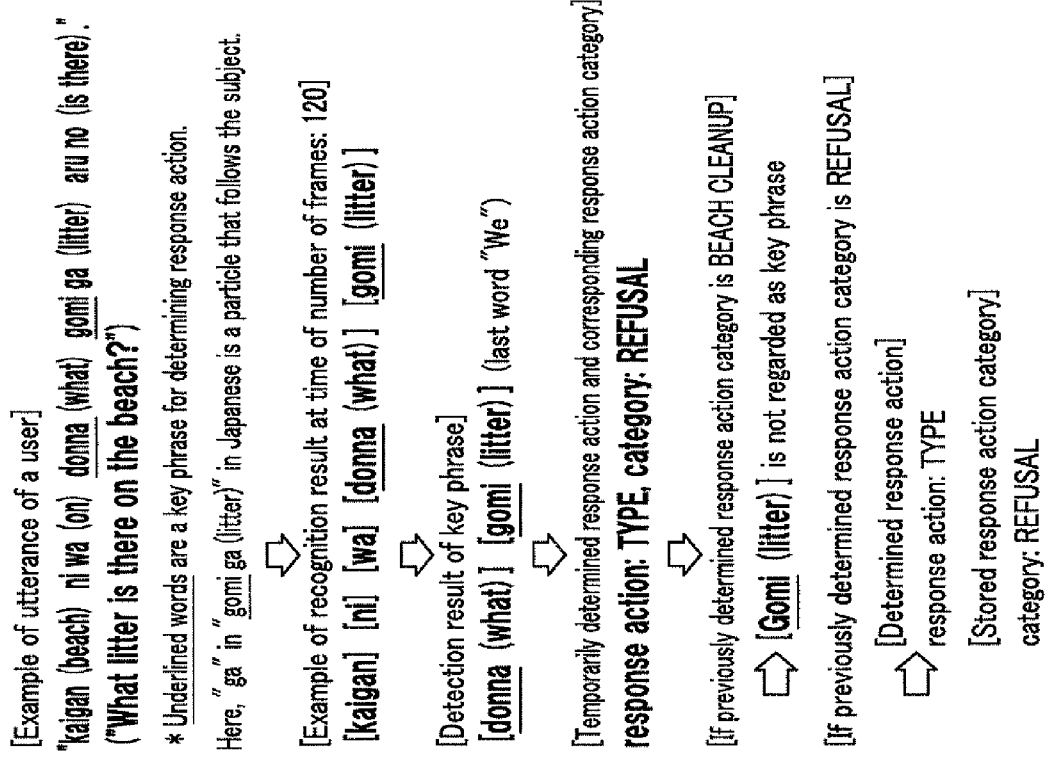

[Example of utterance of a user]
"kaigan (beach) ni wa (on) donna (what) gomi ga (litter) aru no (is there)."
("What litter is there on the beach?")
* Underlined words are a key phrase for determining response action.
Here, "ga" in "gomi ga (litter)" in Japanese is a particle that follows the subject.

[Example of recognition result at time of number of frames: 120]
[kaigan] [ni] [wa] [donna (what)] [gomi (litter)]

⇩

[Detection result of key phrase]
[donna (what)] [gomi (litter)] (last word "We")

⇩

[Temporarily determined response action and corresponding response action category]
response action: TYPE, category: REFUSAL

⇩

[If previously determined response action category is BEACH CLEANUP]
[Gomi (litter)] is not regarded as key phrase

[If previously determined response action category is REFUSAL]
[Determined response action]
response action: TYPE
[Stored response action category]
category: REFUSAL

INTERACTIVE DEVICE THAT RECOGNIZES INPUT VOICE OF A USER AND CONTENTS OF AN UTTERANCE OF THE USER, AND PERFORMS A RESPONSE CORRESPONDING TO THE RECOGNIZED CONTENTS

CROSS-REFERENCE TO RELATED APPLICATION

This application claims the foreign priority benefit under 35 U.S.C §119 of Japanese Patent Application No. 2011-092683 filed on Apr. 19, 2011, the disclosure of which is incorporated herein by reference.

BACKGROUND OF THE INVENTION

1. Field of the Invention

The present invention relates to an interactive device that performs a response action corresponding to the contents of utterance by a user.

2. Description of the Invention

Interactive devices are utilized in communication robots and the like capable of communicating with users and are required to recognize user's input voice that is continuous without clear breaks between sentences. Accordingly, the interactive devices employ a continuous voice recognition system using statistical voice recognition processes. One-path search and multi-path search are known as search algorithms in such statistical voice recognition processes.

The one-path search is a method to search word candidates only once in the input voice as shown in FIG. 16A. Since the one-path search performs a continuous search throughout duration of utterance by the user from the starting end to the terminal end, the one-path search has an advantage of a relatively high recognition accuracy. The one-path search, however, has a difficulty using complicated models (acoustic models and language models) which requires processing of an increasing amount of data as the vocabulary becomes large.

For this reason, the multi-path search has been well used that performs a plurality of searches on the contents of the user's utterance, as shown in FIG. 16B. In the multi-path search, as shown in FIG. 16B, first, a first-path search is performed in a direction from the starting end to the terminal end of the utterance duration using simple (coarse) models, and then, a second-path search is performed in a direction from the terminal end to the starting end of the utterance duration using complicated (sophisticated) models. The multi-path search is advantageous in that it is easy to implement a multi-path search software into the device because the volume of the entire computing data is reduced due to the switch from a simple model in the first-path search to a sophisticated model in the second path search.

On the other hand, the multi-path search shown in FIG. 16B has a problem that a voice recognition result is unable to be output until the second-path search is completed up to the terminal end of the utterance duration. That is, in the multi-path search as shown in FIG. 16B, which does not allow a timely sequential output of recognition results halfway through the utterance duration, a key phrase to determine a response action is unavailable until a recognition result is output at the terminal end of the utterance duration even if the key phrase has already appeared halfway through the utterance duration. This is the reason that there is a need to make quick decision of voice recognition results halfway through the utterance duration according to certain criteria so that the voice recognition results can be output sequentially while the voice is being input by the user.

To solve this problem, there have been proposed continuous recognition techniques of dividing an utterance duration into sections of a predetermined length, allowing quick decision of recognition results with respect to these sections and sequentially outputting the thus obtained recognition results, as shown in FIG. 16C (For example, Japanese Unexamined Patent Publication No. 6-259090 (See FIG. 1) (hereinafter referred to as Patent Document 1); O. Segawa, K. Takeda and F. Itakura: Continuous Utterance Recognition without Endpoint Detection, Voice Language Information Processing, 34-18, pp. 101-106, December 2000 (hereinafter referred to as Nonpatent Document 1); T. Imai, H. Tanaka, A. Ando and H. Isono: Progressive Early Decision of Utterance Recognition Results by Comparing Most Likely Word Sequences, The Journal of the Institute of Electronics, Information and Communication Engineers (J. IEICE), D-II, Vol. J84-D-II, No. 9, pp. 1942-1949, September 2001) (hereinafter referred to as Nonpatent Document 2). Such continuous recognition techniques are utilized mainly in automation of, for example, phonetic transcription of utterances and preparation of subtitles using a voice recognition system.

Patent Document 1 proposes a voice interactive system that recognizes input voice in an utterance duration, extracts a sequence of semantic expressions from the input voice, divides the sequence of semantic expressions into units of meaning and performs processing of each unit of meaning. Nonpatent Document 1 proposes a technique of setting a frame interval, for which quick decision is made, to 1.5-3 seconds and searching, in a first-path search, a last word in and around each frame interval to thereby prevent a decrease in a recognition rate resulting from a short utterance duration. Nonpatent Document 2 proposes a continuous voice recognition technique of searching a last word that enables quick decision by comparing most likely word sequences for every interval of 300 msec in a one-path search, thereby reducing an average delay time in word decision to 512 msec.

However, the techniques of Patent Document 1 and Nonpatent Documents 1 and 2, which use a result of the first-path search (hereinafter referred to as the first path where appropriate) for specifying intervals at which user's utterance is divided into frames for quick decision, have a problem that a word division error, if any, in a search result of the first path affects a search result in the second path search (hereinafter referred to as the second path where appropriate), resulting in a decreased recognition rate.

Further, continuous recognition through voice interaction requires faster responses than that for phonetic transcription of utterances and preparation of subtitles, and thus requires quick decision to be made at shorter intervals. In the techniques of Patent Document 1 and Nonpatent Documents 1 and 2, if the response speed is increased by shortening each of the intervals by which user's utterance is divided into frames for quick decision, the length of each of voice recognition sections is reduced, making it difficult to search for word boundaries and thereby decreasing the recognition rate.

The present invention has been made in view of the above problems, and it is an object of the present invention to provide an interactive device which allows quick decision of utterance recognition results and sequential output of the utterance recognition results and which diminishes a decrease in the recognition rate even if user's utterance is divided by a short interval into frames for quick decision.

In order to solve the above problems, the present invention provides an interactive device that recognizes input voice of a user and thereby contents of utterance of the user and performs a predetermined response action corresponding to the recognized contents, the interactive device comprising:

a recognition section setting means that sets a recognition starting point to an utterance starting end frame serving as a starting end of the user's utterance in the input voice and sets a recognition terminal point to a frame which is a predetermined length of time ahead of the recognition starting point to thereby set a recognition section throughout which voice recognition is performed, a voice recognition means that performs voice recognition for the recognition section, a response action determining means that, if a recognition result by the voice recognition means includes a key phrase, determines a response action associated with the key phrase, and a response action executing means that executes the response action determined by the response action determining means, the recognition section setting means repeatedly updating the frame set as the recognition terminal point to a frame which is the predetermined length of time ahead of the recognition terminal point, to thereby set a plurality of recognition sections having different recognition terminal points, and the voice recognition means performing voice recognition on each of the plurality of recognition sections having different recognition terminal points.

In the interactive device as described above, the recognition section setting means divides the user's utterance duration at the recognition terminal points into predetermined lengths of time to set a plurality of recognition sections having different lengths. The voice recognition means performs voice recognition with respect to each of the recognition sections. This allows quick decision of a voice recognition result at every recognition terminal point. That is, a recognition result (a partial recognition result) can be output for each of the plurality of recognition sections.

Preferably, the interactive device according to the present invention has a construction that the recognition section setting means comprises:

a recognition starting point setting unit that detects the utterance starting end frame and sets the recognition starting point at the detected utterance starting end frame, a recognition terminal point setting unit that sets the recognition terminal point at a frame which is the predetermined length of time ahead of the recognition starting point set by the recognition starting point setting unit; and a recognition terminal point updating unit that updates repeatedly the recognition terminal point set by the recognition terminal point setting unit to a frame which is the predetermined length of time ahead of the recognition terminal point, the recognition terminal point updating unit detects an utterance terminal end frame serving as a terminal end of the user's utterance in the input voice and updates the recognition terminal point to the detected utterance terminal end frame, said recognition terminal point being either one of the recognition terminal point set by the recognition terminal point setting unit and the recognition terminal point updated by the recognition terminal point updating unit, the voice recognition means comprises:

a first-path searching unit that searches word candidates in the user's utterance in a direction from the utterance starting end frame to the utterance terminal end frame, and a second-path search unit that searches the word candidates in each of the plurality of recognition sections having different recognition terminal points in a direction from the recognition terminal point to the recognition starting point according to a search result produced by the first-path searching unit, and the response action determining means determines, when a search result produced by the second-path search unit includes the key phase, the response action corresponding to the key phrase.

In the interactive device as described above, the recognition terminal point updating unit updates repeatedly a recognition terminal point to a frame which is a predetermined length of time ahead of the recognition terminal point to thereby set a plurality of recognition sections of different lengths. The first-path searching unit performs a search throughout user's entire utterance duration, and the second-path searching unit performs a search with respect of each of the plurality of recognition sections, achieving voice recognition improved both in speed and accuracy.

Further, preferably, the interactive device according to the present invention has a construction that the recognition section setting means comprises a recognition starting point updating unit that, when the search result by the second-path search unit includes a break in the user's utterance, updates the recognition starting point set by the recognition starting point setting unit to a frame located at a top of the break in the user's utterance, and the second-path search unit searches the word candidates with respect to each of the plurality of recognition sections having different recognition starting points and different recognition terminal points.

In the interactive device as described above, if a break in the user's utterance duration such as a short pause, a filler or the like is detected by the second-path searching unit, the recognition starting point updating unit updates the recognition starting point to a frame located at the top of the break in the utterance duration. Thus, in the interactive device, even if the recognition terminal point updating unit updates the recognition terminal point repeatedly to prolong the recognition section stepwise, the recognition starting point updating unit is able to prevent the recognition section from becoming too long. Consequently, the interactive device is advantageous in that it is able to prevent an excessive prolongation of each recognition section to be reversely searched by the second-path search, which results in a reduction of a time taken by the second-path search in a proper response speed.

Still further, preferably, the interactive device according to the present invention has a construction that the key phrase included in the search result by the second-path search unit is made up of a plurality of words.

In the interactive device as described above, the response action determining means determines a response action according to whether or not a search result by the second-path searching unit includes a key phrase made up of a plurality of words. Thus, the interactive device, when continuous voice recognition is performed with respect to each of short lengths of time (for example, 200 msec) obtained by dividing the user's utterance duration, can determine a response action more accurately and more precisely because determination of a response action is not based on a single word candidate so that an error word-candidate in the search results of the second-path searching unit does not affect the determination of the response action.

Yet further, preferably, the interactive device according to the present invention has a construction that the second-path searching unit calculates a word reliability factor indicative of a degree of plausibility of the searched word candidate, and the response action determining means determines, when the search result by the second-path searching unit includes the predetermined key phrase and when the word candidates corresponding to the key phrase have word reliability factors each above a predetermined value, the response action corresponding to the key phrase.

In the interactive device as described above, the response action determining means determines a response action only when a search result by the second-path searching unit includes a key phrase and word candidates corresponding to the key phrase have word reliability factors above a predetermined threshold value. Thus, the interactive device determines a response action more accurately and more precisely than conventionally.

Yet further, preferably, the interactive device according to the present invention has a construction that it further comprises:

a response action storing means that stores, in relation with each other, the key phrase, the response action corresponding to the key phrase, and a response action category serving as a category of the response action, and a response action history storing means that stores a history of response actions already determined by the response action determining means, wherein, when the search result by the second-path search unit includes the key phase, the response action determining means judges, by referring to the response action storing means and the response action history storing means, whether or not a response action category of a response action determined currently by the response action determining means and a response action category of a response action determined previously by the response action determining means are the same, and determines, when the both categories are the same, the response action corresponding to the key phrase.

In the interactive device configured as described above, the response action determining means determines a response action only when the response action and currently determined response action belong to the same category as that of the previously determined response action. Consequently, the interactive device is able to prevent determination of a response, which is based on a wrong search result produced by an error in a search by the second-path searching unit, and which is totally irrelevant to action according to an error a wrong search result by the second-path searching unit that is not related with the previously determined response action.

Yet further, preferably, the interactive device according to the present invention has a construction that, when a response action determined according to a last search result by the second-path search unit and a response action determined according to a previous search result by the second-path search unit are different, the response action executing means executes the response action determined according to the last search result.

In the interactive device configured as described above, the response action executing means executes the response action according to the final second-path search result by the second-path searching unit. Thus, the interactive device is able to prevent a wrong response action from being executed even if the response action according to the second-path search result by the second-path searching unit is produced by an error.

Yet further, preferably, the interactive device according to the present invention has a construction that, when a last search is performed by the second-path search unit after the start of an execution of a response action determined by the response action determining means and when a result of the last search and a result of a previous search corresponding to the response action currently being executed are different, the response action executing means cancels the response action currently being executed and executes a predetermined response action for correcting the response action currently being executed and then executes a response action determined by the response action determining means according to the last search result by the second-path search unit.

In the interactive device configured as described above, when the second-path searching unit produces an error second-path search result halfway through the user's utterance duration and a response action is already determined and executed according to the error second-path search result, the error second-path search result is able to be corrected and the final second-path search result at the terminal end of utterance duration by the second-path searching unit can be adopted to exert a response action.

According to the interactive device of the present invention, by dividing the user's utterance duration by a predetermined length of time into a plurality of recognition sections, performing continuous voice recognition with respect to each of the plurality of recognition sections, a proper response speed required for continuous recognition of the plurality of recognition sections is ensured while preventing an excessive prolongation of each recognition section and thus preventing a reduction in the recognition rate thereof.

BRIEF DESCRIPTION OF THE DRAWINGS

FIGS. 4A-4C are schematic views showing a series of processings performed by the voice recognition means of the interactive device according to the first embodiment of the present invention: FIG. 4A is a view showing an example of utterance of a user; FIG. 4B is a view showing an example of setting of recognition sections; and FIG. 4C is a view showing an example of a recognition result produced from the example of utterance of the user.

FIG. 5 is a schematic view showing a table stored in a response action determining means of the interactive device according to the first embodiment of the present invention.

FIG. 9A is a flowchart showing the procedure of determining a response action; and FIG. 9B is a view showing a specific example of the procedure of determining a response action.

FIGS. 10A and 10B are views showing another example of the procedure of determining a response action in the operation of the interactive device according to the first embodiment of the present invention: FIG. 10A is a flowchart showing the procedure of determining a response action; and FIG. 10B is a view showing a specific example of the procedure of determining a response action.

FIG. 14 is a schematic view showing a table stored in a response action determining means of the interactive device according to the second embodiment of the present invention.

FIGS. 15A and 15B are views showing an example of a procedure of determining a response action in the operation of the interactive device according to the second embodiment of the present invention: FIG. 15A is a flowchart showing the procedure of determining a response action; and FIG. 15B is a view showing a specific example of the procedure of determining a response action.

FIG. 16A is a schematic view showing an outline of a one-path search; FIGS. 16B and 16C are schematic views showing outlines of multi-path searches, respectively.

DETAILED DESCRIPTION OF THE PREFERRED EMBODIMENT

Figure 1:
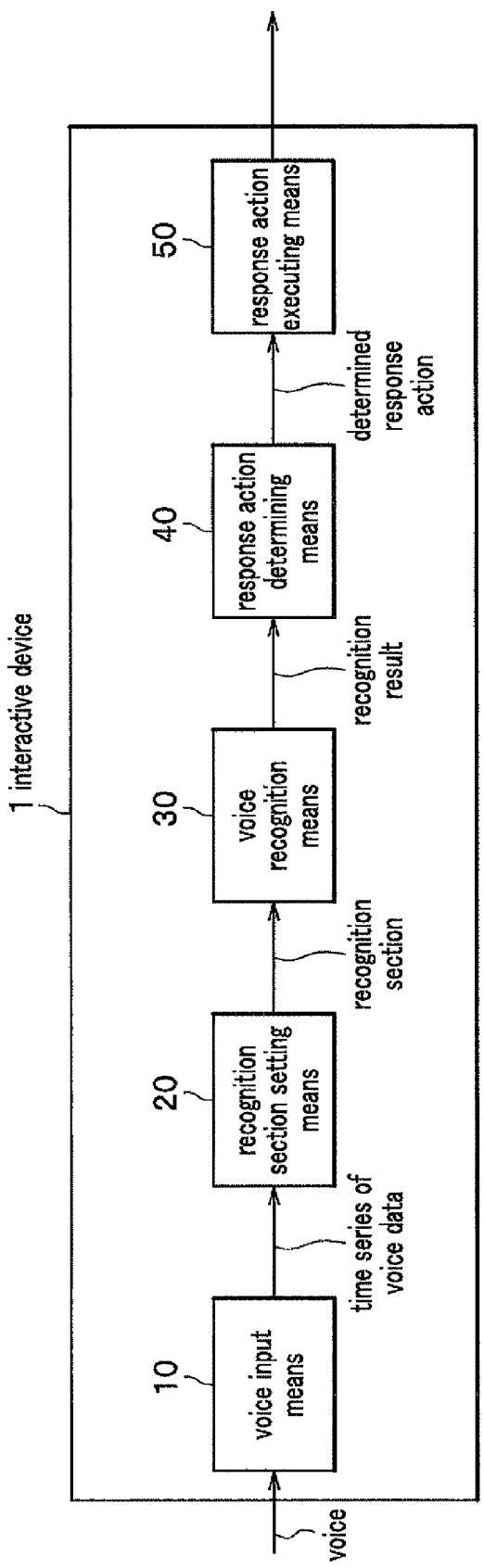
FIG. 1 is a block diagram showing a configuration of an interactive device according to a first embodiment of the present invention.

Descriptions will be made of an interactive device according to the present invention with reference to the drawings. In a second embodiments, like components are denoted by like reference numerals of a first embodiment, and, where appropriate, will not be further described.

First Embodiment

Hereinafter, detailed descriptions will be made of an interactive device 1 according to a first embodiment of the present invention with reference to FIGS. 1-5. The interactive device 1 is a device which, when user's voice is input thereinto, recognizes contents of user's utterance in the user's input voice (hereinafter referred to as the "input voice" where appropriate) and performs a response action that corresponds to the utterance contents. The interactive device 1 is used in, for example, aforementioned communication robots, systems for selling airline tickets or other types of tickets using the input voice, or the like.

As shown in FIG. 1, the interactive device 1 includes a voice input means 10, a recognition section setting means 20, a voice recognition means 30, a response action determining means 40 and a response action executing means 50. In the following paragraphs, these components of the interactive device 1 will be described in detail.

Figure 2:
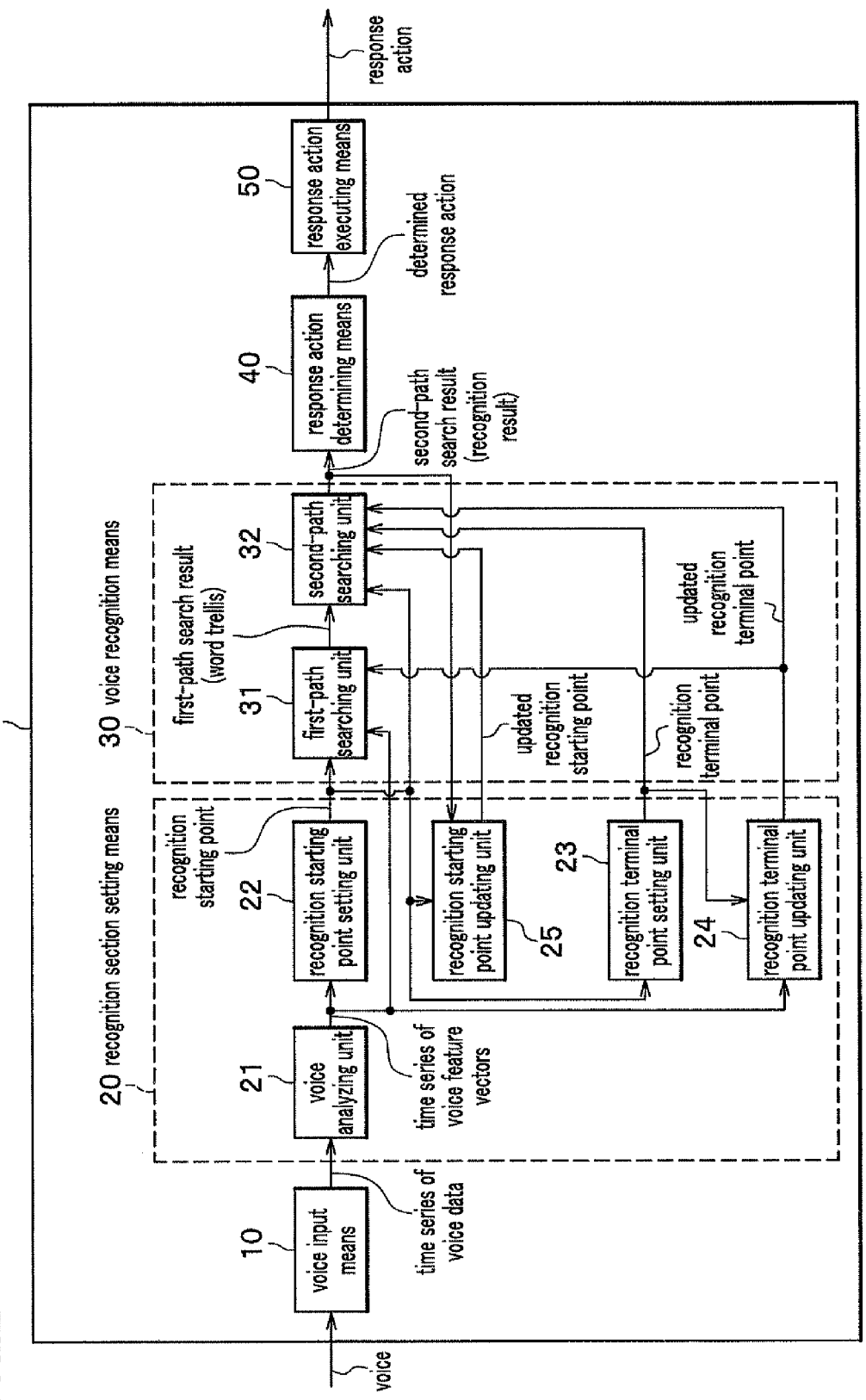
FIG. 2 is a block diagram showing details of the configuration of the interactive device according to the first embodiment of the present invention.

As shown in FIG. 2, the voice input means 10 is a means into which the user's voice is input through an unillustrated microphone or the like installed outside the interactive device 1. The voice input means 10 is, for example, an audio interface, and as shown in FIG. 1, outputs the input voice to the recognition section setting means 20 as voice data in the time series.

As shown in FIG. 2, the recognition section setting means 20 sets a recognition section throughout which voice recognition is performed. More specifically, the recognition section setting means 20 sets both a recognition starting point serving as a starting end of the recognition section for voice recognition and a recognition terminal point serving as a terminal end of the recognition section for voice recognition to thereby set the recognition section of a predetermined length (of a predetermined frame interval). As shown in FIG. 2, the recognition section setting means 20 preferably includes a voice analyzing unit 21, a recognition starting point setting unit 22, a recognition terminal point setting unit 23, a recognition terminal point updating unit 24, and a recognition starting point updating unit 25.

As shown in FIG. 2, the voice analyzing unit 21 converts voice data in the time series into voice feature vectors in the time series. The voice analyzing unit 21 divides the time series voice data including the user's input voice into frames of a predetermined length of time of, for example, about 10 msec., and then analyzes feature values of the respective frames by the cepstrum analysis to create the time series voice feature vectors corresponding to the time series voice data. Specific examples of voice feature vectors include MFCC (Mel Frequency Cepstral Coefficient), $\Delta$MFCC, $\Delta\Delta$MFCC, $\Delta$Logarithmic Power vectors and the like.

As shown in FIG. 2, the voice analyzing unit 21 receives the time series voice data including data on the user's input voice from the voice input means 10. Then, the voice analyzing unit 21 converts the received time series voice data into the time series voice feature vectors in the above manner, and after that, as shown in FIG. 2, outputs the time series voice feature vectors to each of the recognition starting point setting unit 22, the recognition terminal point updating unit 24, and a first-path searching unit 31.

As shown in FIG. 2, the recognition starting point setting unit 22 sets the recognition starting point of the recognition section for voice recognition. By using, for example, power information of the time series voice feature vectors, the recognition starting point setting unit 22 detects, as an utterance starting end frame serving as a starting end of the user's utterance, a frame having a voice feature vector whose power is above a predetermined threshold value and sets the recognition starting point at the detected utterance starting end frame.

As shown in FIG. 2, the recognition starting point setting unit 22 receives the time series voice feature vectors from the voice analyzing unit 21. The recognition starting point setting unit 22 sets the recognition starting point of the recognition section in the above manner, and as shown in FIG. 2, outputs the recognition starting point to each of the recognition terminal point setting unit 23, the recognition starting point updating unit 25, the first-path searching unit 31, and a second-path searching unit 32.

As shown in FIG. 2, the recognition terminal point setting unit 23 sets the recognition terminal point of the recognition section for voice recognition. More specifically, the recognition terminal point setting unit 23 sets the recognition terminal point at a frame which is a predetermined length of time ahead of the recognition starting point. Here, the predetermined length of time is preferably equivalent to, for example, time length for a morpheme in a morphological analysis, and more preferably, 200 msec.

As shown in FIG. 2, the recognition terminal point setting unit 23 receives the recognition starting point from the recognition starting point setting unit 22. The recognition terminal point setting unit 23 then sets the recognition terminal point of the recognition section in the above manner, and as shown in FIG. 2, outputs the recognition terminal point to each of the recognition terminal point updating unit 24 and the second-path searching unit 32.

As shown in FIG. 2, the recognition terminal point updating unit 24 updates the recognition terminal point of the recognition section for voice recognition. More specifically, the recognition terminal point updating unit 24 updates repeatedly the recognition terminal point already set by the recognition terminal point setting unit 23, to a frame which is the predetermined length of time ahead of the already set recognition terminal point. That is, the recognition terminal point updating unit 24 shifts the already set recognition terminal point repeatedly every time by the predetermined length of time to thereby prolong the recognition section stepwise every time by the predetermined length of time. Here, the predetermined length of time is preferably equivalent to, for example, time length for a morpheme in the morphological analysis, and more preferably, 200 msec.

In this way, the recognition terminal point updating unit 24 updates the recognition terminal point repeatedly to thereby divide the section of user's utterance by the predetermined length of time. This allows quick decision of a voice recognition result at every recognition terminal point. Further, setting the predetermined length of time to, for example, 200 msec allows quick decision of a voice recognition result with respect to every smaller number of frames than conventionally. That is, a partial recognition result can be produced at every recognition terminal point, resulting in an increased response speed of the interactive device 1.

Figure 3:
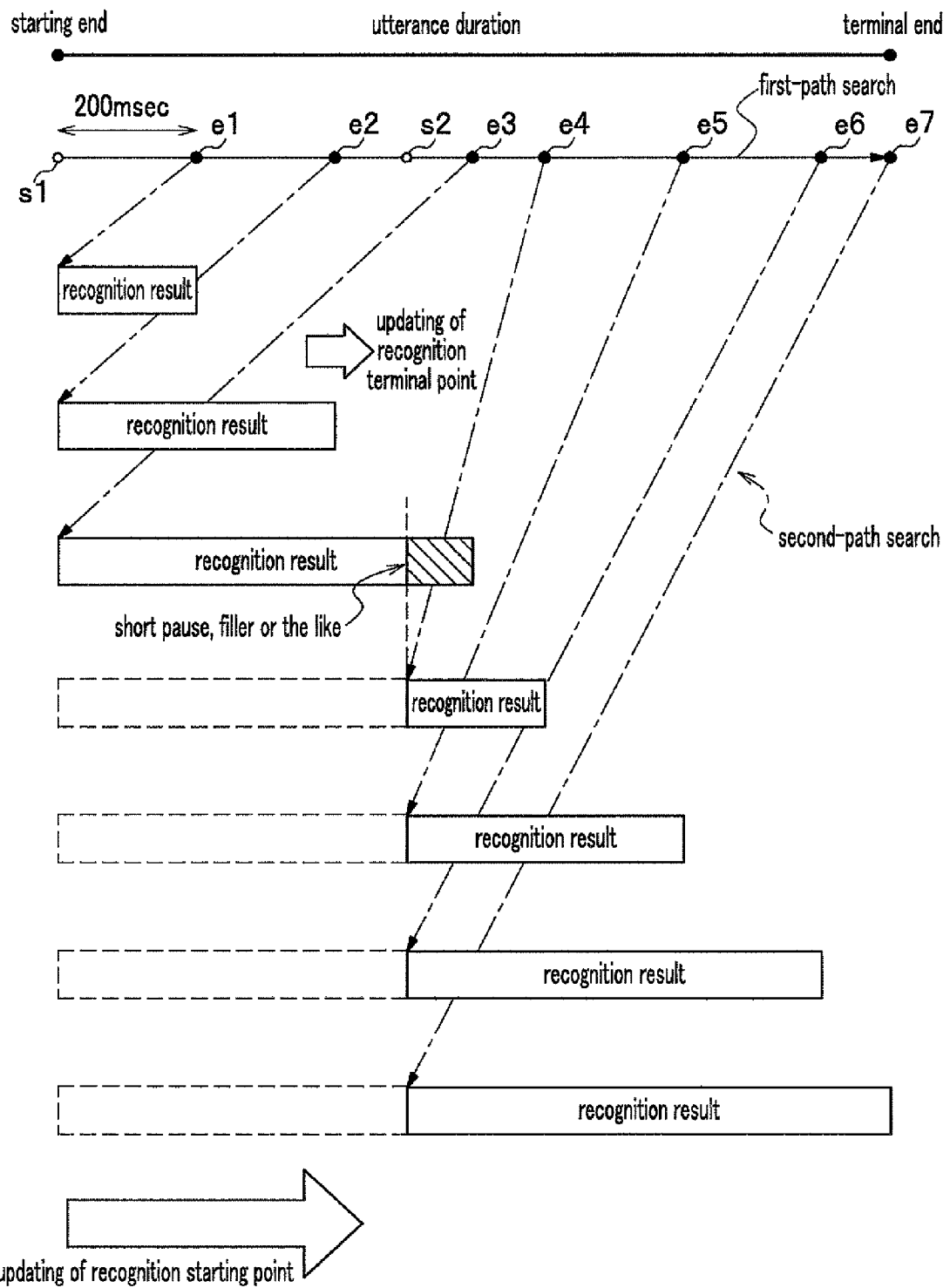
FIG. 3 is a schematic view showing an outline of searches performed by a voice recognition means of the interactive device according to the first embodiment of the present invention.

Here, as shown in FIG. 3, it is assumed that a recognition starting point s1 is set at a frame located at the starting end of the user's utterance duration and a recognition terminal point e1 is set at a frame which is, for example, 200 msec ahead of the recognition starting point s1. In this case, the recognition terminal point updating unit 24 updates the recognition terminal point e1 to a recognition terminal point e2 which is 200 msec ahead of the recognition terminal point e1. Further, the recognition terminal point updating unit 24 updates, likewise, the recognition terminal point e2 to a recognition terminal point e3. In this way, the recognition section setting means 20 sets a plurality of recognition sections of different lengths (a section between s1 and e1: 200 msec, a section between s1 and e2: 400 msec, a section between s1 and e3: 600 msec).

Here, by using, for example, power information of the time series voice feature vectors, the recognition terminal point updating unit 24 detects as an utterance terminal end frame serving as a terminal end of the user's utterance duration, a frame having a voice feature vector whose power is below a predetermined threshold value. The recognition terminal point updating unit 24 updates the recognition terminal point by shifting the recognition terminal point to the utterance terminal end frame if the utterance terminal end frame is present within the predetermined length of time (for example, 200 msec) ahead of the recognition starting point.

As shown in FIG. 2, the recognition terminal point updating unit 24 receives the time series voice feature vectors from the voice analyzing unit 21 and the recognition terminal point from the recognition terminal point setting unit 23. The recognition terminal point updating unit 24 then updates the recognition terminal point in the above manner, and after that, as shown in FIG. 2, outputs the updated recognition terminal point to each of the first-path searching unit 31 and the second-path searching unit 32.

As shown in FIG. 2, the recognition starting point updating unit 25 updates the recognition starting point of the recognition section for voice recognition. More specifically, as shown in FIG. 3, if a search result by the second-path searching unit 32 to be described later includes a break in the user's utterance duration, the recognition starting point updating unit 25 updates the recognition starting point already set by the recognition starting point setting unit 22 to a frame located at the top of the break in the user's utterance duration.

Here, the break in the user's utterance duration refers to, for example, a short pause (breath), a filler (a vocal sound such as "Ahh") and the like in the utterance duration. In the case of the short pause, it refers to a silence of, for example, less than 20 msec in the input voice. The second-path searching unit 32 that uses sophisticated models for searching final word candidates as described later can detect breaks of the user's utterance duration accurately. Thus, the recognition starting point updating unit 25 is able to properly divide the input voice at the breaks of the user's utterance duration.

If the recognition starting point has been updated by the recognition starting point updating unit 25 as described above, the recognition terminal point updating unit 24 updates the recognition terminal point to a frame which is the predetermined length of time (for example, 200 msec) ahead of the updated recognition starting point. That is, as shown in FIG. 3, a third search result by the second-path searching unit 32 (a search result with respect to the section between s1 and e3) includes a break in the user's utterance duration, the recognition starting point updating unit 25 sets a new recognition starting point s2 at a frame located at the top of the break in the utterance duration. Then, the recognition terminal point updating unit 24 updates the recognition terminal point e3 to a recognition terminal point e4 by shifting the recognition terminal point e3 to a frame which is 200 msec ahead of the recognition starting point s2. In this way, if the recognition starting point updating unit 25 updates the recognition starting point, the recognition terminal point updating unit 24 again updates the recognition terminal point to a frame which is the predetermined length of time ahead of the updated recognition starting point.

In the interactive device 1 with the above-described recognition starting point updating unit 25, if a break in the user's utterance duration such as a short pause, a filler or the like is detected by the second-path searching unit 32, the recognition starting point updating unit 25 updates the recognition starting point to a frame located at the top of the break in the utterance duration. Thus, in the interactive device 1, even if the recognition terminal point updating unit 24 updates the recognition terminal point repeatedly to prolong the recognition section stepwise, the recognition starting point updating unit 25 is able to prevent the recognition section from becoming too long. Consequently, the interactive device 1 is advantageous in that it is able to prevent an excessive prolongation of each recognition section to be reversely searched by the second-path search, which results in a reduction of a time taken by the second-path search in a proper response speed.

As shown in FIG. 2, the recognition starting point updating unit 25 receives a recognition starting point from the recognition starting point setting unit 22 and a result of the second-path search from the second-path searching unit 32. The recognition starting point updating unit 25 then updates the received recognition starting point in the above manner, and as shown in FIG. 2, outputs the updated recognition starting point to the second-path searching unit 32. Hereinafter, descriptions will be made of the rest of configuration of the interactive device 1.

As shown in FIG. 2, the voice recognition means 30 performs voice recognition with respect to each recognition section. More specifically, the voice recognition means 30 receives the voice feature vectors created in the time series by the voice analyzing unit 21 and converts the input voice into a text through calculation of likelihoods by using language models, acoustic models, and word dictionaries.

Here, the language models are for defining connection relations between words and are created by morphological analysis of a huge amount of text data. The language models may be, for example, word N-gram models. The acoustic models have recorded therein frequency patterns of phonemes (each substantially equivalent to a single Roman letter) and syllables (each equivalent to a single letter in Kana, the syllabic Japanese scripts) and are created by collecting a huge amount of voice data. The acoustic models may be, for example, HMM: hidden Markov models. The word dictionaries are for defining a lexicon of a language (a collection of words) to be recognized and pronunciations of those words. The language models, the acoustic models, and the word dictionaries are stored in an unillustrated memory means and are configured to be able to be input into and output from the voice recognition means 30. The voice recognition means 30 preferably includes the first-path searching unit 31 and the second-path searching unit 32, as shown in FIG. 2.

As shown in FIG. 3, the first-path searching unit 31 searches word candidates in the user's utterance duration in a direction from the utterance starting end frame to the utterance terminal end frame. Here, the utterance starting end frame more specifically refers to a recognition starting point first set by the recognition starting point setting unit 22 (a recognition starting point having not been updated by the recognition starting point updating unit 25, for example, the recognition starting point s1 in FIG. 3). The utterance terminal end frame more specifically refers to a recognition terminal point set at the frame at the terminal end of the user's utterance by the recognition terminal point updating unit 24 (for example, the recognition terminal point e7 in FIG. 3). That is, the first-path searching unit 31 performs voice recognition throughout the user's entire utterance duration (from the starting end to the terminal end).

By using the language models, the acoustic models and the word dictionaries, the first-path searching unit 31 performs a frame synchronizing beam search in a forward (left to right) direction while simultaneously receiving the voice feature vectors in the time series. The first-path search performed by the first-path searching unit 31 is a preliminary search performed before the second-path search to be described later, and aims at narrowing down word candidates in the input voice. Thus, the first-path searching unit 31 performs a heuristic search where priority is placed on speed rather than on accuracy.

More specifically, by using word bigram models, which are unsophisticated language models, as well as unsophisticated acoustic models, the first-path searching unit 31 performs the first-path search in real time while simultaneously receiving the time series voice feature vectors that correspond to the input voice, and as the result of the first-path search, outputs a word trellis (a set of word candidates). The word trellis is an index of word candidates in the frames obtained during the first-path search and is equivalent to a so-called intermediate result of voice recognition. The word trellis includes the likelihood of each word candidate.

As shown in FIG. 2, the first-path searching unit 31 receives the time series voice feature vectors from the voice analyzing unit 21, the recognition starting point (the starting end of utterance duration) from the recognition starting point setting unit 22, and the updated recognition terminal point (the terminal end of utterance duration) from the recognition terminal point updating unit 24. Then, the first-path searching unit 31 performs the first-path search in the above manner, and outputs the first-path search result (word trellis) of the first-path search to the second-path searching unit 32.

As shown in FIG. 3, the second-path searching unit 32 searches word candidates in the recognition section in a direction from the recognition terminal point to the recognition starting point. After completion of the first-path search by the first-path searching unit 31 by using the language models, the acoustic models and word dictionaries as described above, the second-path searching unit 32 performs stack decoding search in a backward (right to left) direction. The second-path search is a post-search performed after the first-path search, and by re-searching the intermediate result of the first-path search, it aims at determining final word candidates (hypotheses). Thus, the second-path searching unit 32 performs a search where priority is placed on accuracy rather than on speed.

More specifically, by using word tri-gram models, which are sophisticated language models, as well as sophisticated acoustic models, the second-path searching unit 32 performs the second-path search with respect to the word trellis in the backward direction, and as the results of the second-path search, outputs final word candidates. In this way, the second-path searching unit 32 performs the backward search of the result (word trellis) narrowed down by the first-path searching unit 31, and therefore is able to use likelihoods of the hypotheses (word candidates) calculated by the first-path search, as predictions on data which the second-path searching unit 32 has not yet searched. In this way, the second-path searching unit 32 performs searches sequentially while simultaneously being supplied with evaluations on the likelihoods of hypotheses (word candidates) over the entire input voice.

Unlike the first-path searching unit 31, the second-path searching unit 32 searches the word candidates throughout each of the plurality of recognition sections of different lengths as shown in, for example, FIG. 3. When, for example, the first-path searching unit 31 creates a word trellis, the second-path searching unit 32 performs a search on the word trellis from the recognition terminal point e1 set by the recognition terminal point setting unit 23 to the recognition starting point s1 set by the recognition starting point setting unit 22 in the backward direction. Further, when the recognition terminal point updating unit 24 updates the recognition terminal point from e1 to e2, the second-path searching unit 32 performs a search on the word trellis from the recognition terminal point e2 set by the recognition terminal point updating unit 24 to the recognition starting point s1 set by the recognition starting point setting unit 22 in the backward direction.

Further, when the recognition starting point is updated from s1 to s2 by the recognition starting point updating unit 25, the second-path searching unit 32 performs a search on the word trellis from a recognition terminal point e4 updated by the recognition terminal point updating unit 24 to the recognition starting point s2 updated by the recognition starting point updating unit 25 in the backward direction. Further, when the recognition terminal point is updated from e4 to e5 by the recognition terminal point updating unit 24, the second-path searching unit 32 performs a search on the word trellis from the recognition terminal point e5 updated by the recognition terminal point updating unit 24 to the recognition starting point s2 updated by the recognition starting point updating unit 25 in the backward direction. Further, when the recognition terminal point is updated from e5 to e6 by the recognition terminal point updating unit 24, the second-path searching unit 32 performs a search on the word trellis from the recognition terminal point e6 updated by the recognition terminal point updating unit 24 to the recognition starting point s2 updated by the recognition starting point updating unit 25 in the backward direction. When the recognition terminal point is updated from e6 to e7 by the recognition terminal point updating unit 24, the second-path searching unit 32 performs a search on the word trellis from the recognition terminal point e7 (the terminal end of utterance duration) by the recognition terminal point updating unit 24 to the recognition starting point s2 updated by the recognition starting point updating unit 25 in the backward direction.

As described above, the second-path searching unit 32 performs the second-path search with respect of each of the plurality of recognition sections of different lengths set by the recognition section setting means 20, and produces results of the second-path search. The number of the results of the second-path search corresponds to the number of the plurality of recognition sections. Here, the second-path searching unit 32 preferably calculates a word reliability factor indicative of a degree of plausibility of each of the searched word candidates. More specifically, the word reliability factor includes an acoustic score indicative of a degree of acoustical closeness between a word candidate and a vocal sound and a language score indicative of a connection probability between words. With this configuration, as described later, only when a search result by the second-path searching unit 32 includes a key phase and word candidates corresponding to the key phase have word reliability factors above a predetermined value, the response action determining means 40 determines a response action corresponding to the key phrase.

As shown in FIG. 2, the second-path searching unit 32 receives the result of the first-path search from the first-path searching unit 31, the recognition starting point from the recognition starting point setting unit 22, the recognition terminal point from the recognition terminal point setting unit 23, the updated recognition terminal point from the recognition terminal point updating unit 24, and the updated recognition starting point from the recognition starting point updating unit 25. Then, the second-path searching unit 32 performs the second-path search, and outputs the results of the second-path search to the recognition starting point updating unit 25 and the response action determining means 40. Hereinafter, descriptions will be made of the rest of configuration of the interactive device 1.

As shown in FIG. 2, the response action determining means 40 determines a response action according to a recognition result produced by the voice recognition means 30. The response action determining means 40 has stored therein relations between predetermined key phrases and response actions corresponding to the key phrases in the form of, for example, a table. Then, by referring to the recognition result by the voice recognition means 30, more specifically, to the table, the response action determining means 40 judges whether or not a recognition result produced by the voice recognition means 30, more specifically, a last word among word candidates included in the result of the second-path search performed by the second-path searching unit 32 matches a key phrase, and if it does, determines a response action that corresponds to the matched key phrase.

More specifically, the above-mentioned key phrase refers to words expected to be included in the results of the second-path search performed by the second-path searching unit 32. Further, the last word refers to a word at a terminal position among word candidates (at a terminal position in a word sequence) included in a result of the second-path search performed by the second-path searching unit 32. When, for example, the voice "kaigan (beach) ni wa (on) donna (what) gomi ga (litter) am no (is there)" meaning "What litter is there on the beach?" is input into the interactive device 1, and a result of the second-path search performed by the second-path searching unit 32 includes four word-candidates "kaigan (beach)", "ni wa (on)", "donna (what)" and "gomi (litter)", the last word is "gomi (litter)".

The response action determining means 40 receives from the voice recognition means 30 a plurality of voice recognition results corresponding in number to a plurality of recognition sections. For example, as shown in FIG. 4A, if the voice "kaigan (beach) ni wa (on) donna (what) gomi ga (litter) am no (is there)" meaning "What litter is there on the beach?" is input from the user into the voice input means 10, the recognition section setting means 20 sets a plurality of recognition sections of different lengths in the utterance duration as shown in FIG. 4B. Then, as shown in FIG. 4C, the voice recognition means 30 performs voice recognition with respect to each of the plurality of recognition sections. The recognition results are sequentially input into the response action determining means 40. Since the last word among the word candidates included in the recognition result mentioned in the "number of frames constituting a recognition section: 100" in FIG. 4C matches the key phrase, the response action determining means 40 determines a response action according to the recognition result upon receipt of the recognition result mentioned in the "number of frames constituting recognition section: 100".

The "number of frames constituting recognition section" in FIG. 4C is the length of a recognition section represented by the number of frames, and the "frame" corresponds to a section of about 10 msec in the use's input voice. Thus, when one frame is 10 msec long, the "number of frames constituting recognition section: 20" in the second row of FIG. 4C becomes 200 msec, the "number of frames constituting recognition section: 40" in the third row is 400 msec, and the "number of frames constituting recognition section: 60" in the fourth row is 600 msec, indicating that the length of the recognition section is increased stepwise every time by 200 msec.

Here, the response action determining means 40 judges whether or not a last word among the word candidates included in a result of the second-path search performed by the second-path searching unit 32 matches a key phrase made up of a predetermined word. Preferably, the response action determining means 40 judges whether or not a last-word group made up of a plurality of words including the last word match a key phrase made up of a plurality of words.

In this case, as shown in, for example, FIG. 5, the response action determining means 40 has stored therein relations between key phrases each made up of a plurality of words and response actions corresponding to the key phrases in the form of, for example, a table. Then, by referring to the table, the response action determining means 40 judges whether or not a last-word group consisting of a last word and penultimate word or words that are included in a result of the second-path search performed by the second-path searching unit 32 match any one of the key phrases, and if they do, determines a response action that corresponds to the matched key phrase.

In the column "Response action" of FIG. 5, the "TYPE", "AMOUNT", "PARTICIPATE" and "SCHEDULE" represent kinds of respective response actions, respectively. If, for example, the response action determining means 40 determines the response action "TYPE", the response action executing means 50 to be described later executes a response action of responding to a type of litter. If, for example, the response action determining means 40 determines the response action "AMOUNT", the response action executing means 50 to be described later executes a response action of responding an amount of litter.

The response action determining means 40 receives a plurality of results of voice recognition corresponding in number to a plurality of recognition sections from the voice recognition means 30. If, for example, as shown in FIG. 4A, the voice input means 10 receives the voice "kaigan (beach) ni wa (on) donna (what) gomi ga (litter) am no (is there)" meaning "What litter is there on the beach?" from the user, the recognition section setting means 20 sets a plurality of recognition sections of different lengths in the utterance duration as shown in FIG. 4B, then, the voice recognition means 30 performs voice recognition with respect to each of the plurality of recognition sections, as shown in FIG. 4C and outputs the results of the voice recognition sequentially into the response action determining means 40. Then, since the last-word group included in the result of recognition in the "number of frames constituting recognition section: 120" in FIG. 4C match the key phrase, the response action determining means 40 determines a response action according to the recognition result upon receipt of the recognition result in the "number of frames constituting recognition section: 120" in FIG. 4C.

In the interactive device 1 including the above-described response action determining means 40, the response action determining means 40 determines a response action according to whether or not a search result by the second-path searching unit 32 includes a key phrase made up of a plurality of words. Thus, the interactive device 1, when continuous voice recognition is performed with respect to each of short lengths of time (for example, 200 msec) obtained by dividing the user's utterance duration, can determine a response action more accurately and more precisely because determination of a response action is not based on a single word candidate so that an error word-candidate, if any, in the search results of the second-path searching unit 32 does not affect the determination of the response action.

Preferably, if the response action determining means 40 calculates the word reliability factors of the word candidates obtained by searching by the second-path searching unit 32, the word reliability factors of the word candidates are each compared with a predetermined threshold value in order to determine a response action.

In this case, the response action determining means 40, while simultaneously judging whether or not a last word included in a result of the second-path search performed by the second-path searching unit 32 matches a key phrase, compares the word reliability factor of the last word with a predetermined threshold value. Then, the response action determining means 40, only when the last word matches the key phrase and the word reliability factor of the last word is above the predetermined threshold value, determines a response action that corresponds to the key phrase.

The response action determining means 40 receives a plurality of results of voice recognition corresponding in number to a plurality of recognition sections from the voice recognition means 30. If, for example, as shown in FIG. 4A, the voice input means 10 receives the voice "kaigan (beach) ni wa (on) donna (what) gomi ga (litter) am no (is there)" meaning "What litter is there on the beach?" from the user, the recognition section setting means 20 sets a plurality of recognition sections of different lengths in the utterance duration as shown in FIG. 4B, the voice recognition means 30 performs continuous voice recognition with respect to the recognition sections, as shown in FIG. 4C and outputs the results of the voice recognition into the response action determining means 40.

Then, when a last word (a last-word group) included in the result of recognition in the "number of frames constituting recognition section: 120" in FIG. 4C matches the key phrase, and the word reliability factor of the last word is above a predetermined threshold value, the response action determining means 40 determines a response action according to the recognition result upon receipt of the recognition result mentioned in the "number of frames constituting recognition section: 120" in FIG. 4C. On the other hand, if the word reliability factor thereof is below the predetermined threshold value, the response action determining means 40 does not adopt the recognition result mentioned in the "number of frames constituting recognition section: 120" in FIG. 4C but refers to a recognition result mentioned in the "number of frames constituting recognition section: 140" in the next row of FIG. 4C. Then, the response action determining means 40, when a last word (a last-word group) included in the result of recognition in the "number of frames constituting recognition section: 140" in FIG. 4C matches the key phrase, and the word reliability factor of the last word is above a predetermined threshold value, determines a response action according to the recognition result upon receipt of the recognition result mentioned in the "number of frames constituting recognition section: 140" in FIG. 4C.

In the interactive device 1 including the above-described response action determining means 40, the response action determining means 40 determines a response action only when a search result by the second-path searching unit 32 includes a key phrase and word candidates corresponding to the key phrase have word reliability factors above a predetermined threshold value. Thus, the interactive device 1 determines a response action more accurately and more precisely than conventionally.

The response action determining means 40 receives the second-path search results from the second-path searching unit 32, as shown in FIG. 2. Then, the response action determining means 40 determines a response action in the above manner, and outputs the determined response action to the response action executing means 50.

As shown in FIG. 2, the response action executing means 50 executes the response action determined by the response action determining means 40. Here, preferably, the response action executing means 50 executes a response action determined according to a second-path search result produced at the terminal end of user's utterance duration rather than a response action determined according to a second-path result of the second-path search produced halfway through the user's utterance duration.

In this case, when receiving the response action determined according to the second-path result produced halfway through the user's utterance duration, the response action executing means 50 does not execute this response action and schedules it after receiving the response action determined according to the second-path result produced at the terminal end of user's utterance duration. The second-path result produced halfway through the user's utterance duration refers to a voice recognition result on a recognition section having a recognition terminal point set between, for example, e1-e6 in FIG. 3. The second-path result produced at the terminal end of user's utterance duration refers to a voice recognition result on a recognition section having a recognition terminal point set at, for example, e7 (at the terminal end of the user's utterance duration) in FIG. 3.

Upon receipt of the response action determined according to the second-path search result produced at the terminal end of user's utterance duration from the response action determining means 40, the response action executing means 50 judges whether or not a response action determined according to the second-path search result produced halfway through the user's utterance duration is the same as the response action determined according to the second-path search result produced at the terminal end of user's utterance duration. Then, the response action executing means 50, if they are different, discards the response action determined according to the second-path search result produced halfway through the user's utterance duration, and executes the response action determined according to the second-path search result produced at the terminal end of user's utterance duration. On the other hand, if the response action determined according to the second-path search result produced halfway through the user's utterance duration and the response action determined according to the second-path search result produced at the terminal end of user's utterance duration are the same, the response action executing means 50 discards the response action determined according to the second-path search result produced at the terminal end of user's utterance duration, and executes the response action determined according to the second-path search results produced halfway through the user's utterance duration.

In the interactive device 1 including the response action executing means 50, the response action executing means 50 executes the response action according to the final second-path search result by the second-path searching unit 32. Thus, the interactive device 1 is able to prevent a wrong response action from being executed even if the response action according to the second-path search result by the second-path searching unit 32 is produced by an error.

Further, preferably, when the response action determined according to the second-path search result produced halfway through the user's utterance duration is different from the response action determined according to the second-path search result produced at the terminal end of user's utterance duration, the response action determining means 40, executes a response action for correcting that executed response action if the response action determined according to the second-path search result produced halfway through the user's utterance duration is already executed.

More specifically, when receiving response actions determined according to second-path search results halfway through the user's utterance duration from the response action determining means 40, the response action executing means 50 executes this response action. Then, the response action executing means 50, upon receipt of the response action determined according to the second-path search result produced at the terminal end of user's utterance duration, judges whether or not the response action determined according to the second-path search result produced halfway through the user's utterance duration and the response action determined according to the second-path search result produced at the terminal end of user's utterance duration are the same. Then, the response action executing means 50, if they are different, cancels the response action determined according to the second-path search result produced halfway through the user's utterance duration already executed by the response action executing means 50, and executes a response action for correcting this response action. On the other hand, if they are the same, the response action executing means 50 discards the response action determined according to the second-path search result produced at the terminal end of user's utterance duration, and continues execution of the response action determined according to the second-path search result obtained halfway through the user's utterance duration.

When, for example, the interactive device 1 receives the voice "the voice "kaigan (beach) ni wa (on) donna (what) gomi ga (litter) am no (is there)" meaning "What litter is there on the beach?", and the second-path searching unit 32 produces an error second-path search result, for example: "kaigan (beach)", "ni wa (on)", "donna (what)" and "gomu ga (rubber)", halfway through the user's utterance duration, then, the response action executing means 50 starts executing a response action determined according to the error second-path search result. However, if, during the execution of this response action, the response action executing means 50 receives a response action determined according to a correct second-path search result at the terminal end of utterance duration by the second-path searching unit 32, namely, a result: "kaigan (beach)", "ni wa (on)" "donna (what)", "gomi ga (litter)" and "aru no (is there)", the response action executing means 50 cancels the response action that is being executed and executes a response action for correcting that response action (for example, output of the voice "An error occurred."). Then, the response action executing means 50 starts executing the response action determined according to the correct second-path search result at the terminal end of utterance duration.

In the interactive device 1 including the response action executing means 50, when the second-path searching unit 32 produces an error second-path search result halfway through the user's utterance duration and a response action is already determined and executed according to the error second-path search result, the error second-path search result is able to be corrected and the final second-path search result at the terminal end of utterance duration by the second-path searching unit 32 can be adopted to exert a response action.

As shown in FIG. 2, the response action executing means 50 is supplied with a response action determined by the response action determining means 40 and executes the supplied response action.

The interactive device 1 as described above operates as follows. The recognition section setting means 20 divides the user's utterance duration at the recognition terminal points to set a plurality of recognition sections having different lengths. The voice recognition means 30 performs voice recognition with respect to each of the recognition sections. This allows quick decision of a voice recognition result at every recognition terminal point. That is, a recognition result (a partial recognition result) can be output for each of the plurality of recognition sections.

When the recognition section setting means 20 and the voice recognition means 30 are configured as shown in FIG. 2, the interactive device 1 as described above operates as follows. The recognition terminal point updating unit 24 updates repeatedly a recognition terminal point to a frame which is a predetermined length of time ahead of the recognition terminal point to thereby set a plurality of recognition sections of different lengths. The first-path searching unit 31 performs a search throughout user's entire utterance duration, and the second-path searching unit 32 performs a search with respect of each of the plurality of recognition sections, achieving voice recognition improved both in speed and accuracy.

Consequently, in the interactive device 1, by dividing the user's utterance duration into a plurality of recognition sections of a predetermined length of time, performing continuous voice recognition with respect to each of the plurality of recognition sections, a proper response speed required for continuous recognition of the plurality of recognition sections is ensured while preventing an excessive prolongation of each recognition section and thus preventing a reduction in the recognition rate thereof.

[Operations of the Interactive Device 1]

Figure 6:
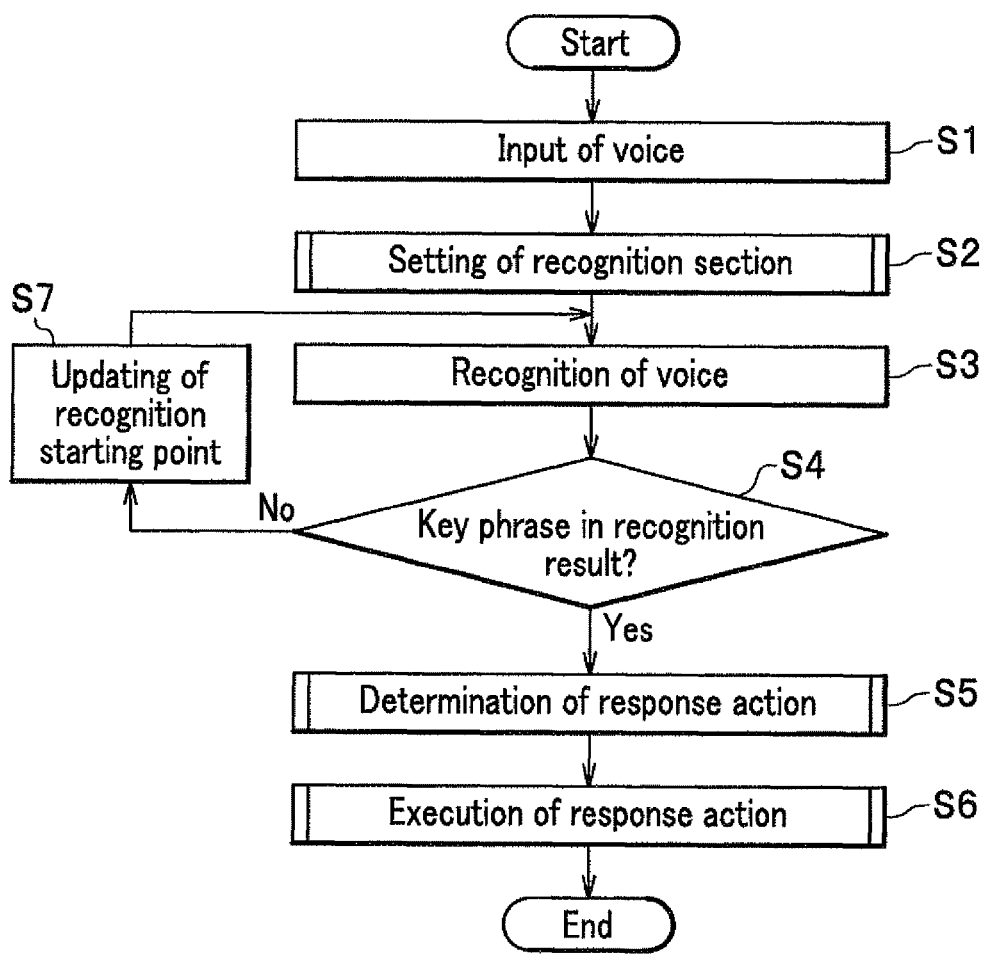
FIG. 6 is a flowchart showing an operation of the interactive device according to the first embodiment of the present invention.

Hereinafter, a brief description will be made of the interactive device 1 of the first embodiment with reference to FIG. 6.

The interactive device 1 operates as follows. First, voice is input from a user into the voice input means 10 (step S1). Then, the recognition section setting means 20 sets a recognition section with respect to which voice recognition is performed throughout (step S2). Next, the voice recognition means 30 performs voice recognition with respect to the set recognition section to produce a recognition result (step S3). Then, the response action determining means 40 judges whether or not the recognition result by the voice recognition means 30 includes a key phrase (step S4).

If the recognition result by the voice recognition means 30 includes the key phrase (YES in step S4), the response action determining means 40 determines a response action corresponding to the key phrase (step S5). On the other hand, if the recognition result by the voice recognition means 30 includes no key phrase (NO in step S4), the procedure returns to step S3. Then, the response action executing means 50 executes the response action determined by the response action determining means 40 (step S6), and the procedure is ended. Here, if the recognition result by the voice recognition means 30 includes no the key phrase (NO in step S4), a recognition starting point may be updated (step S7) before the procedure returns to step S3.

(Details of Setting of Recognition Section (Step S2))

Figure 7:
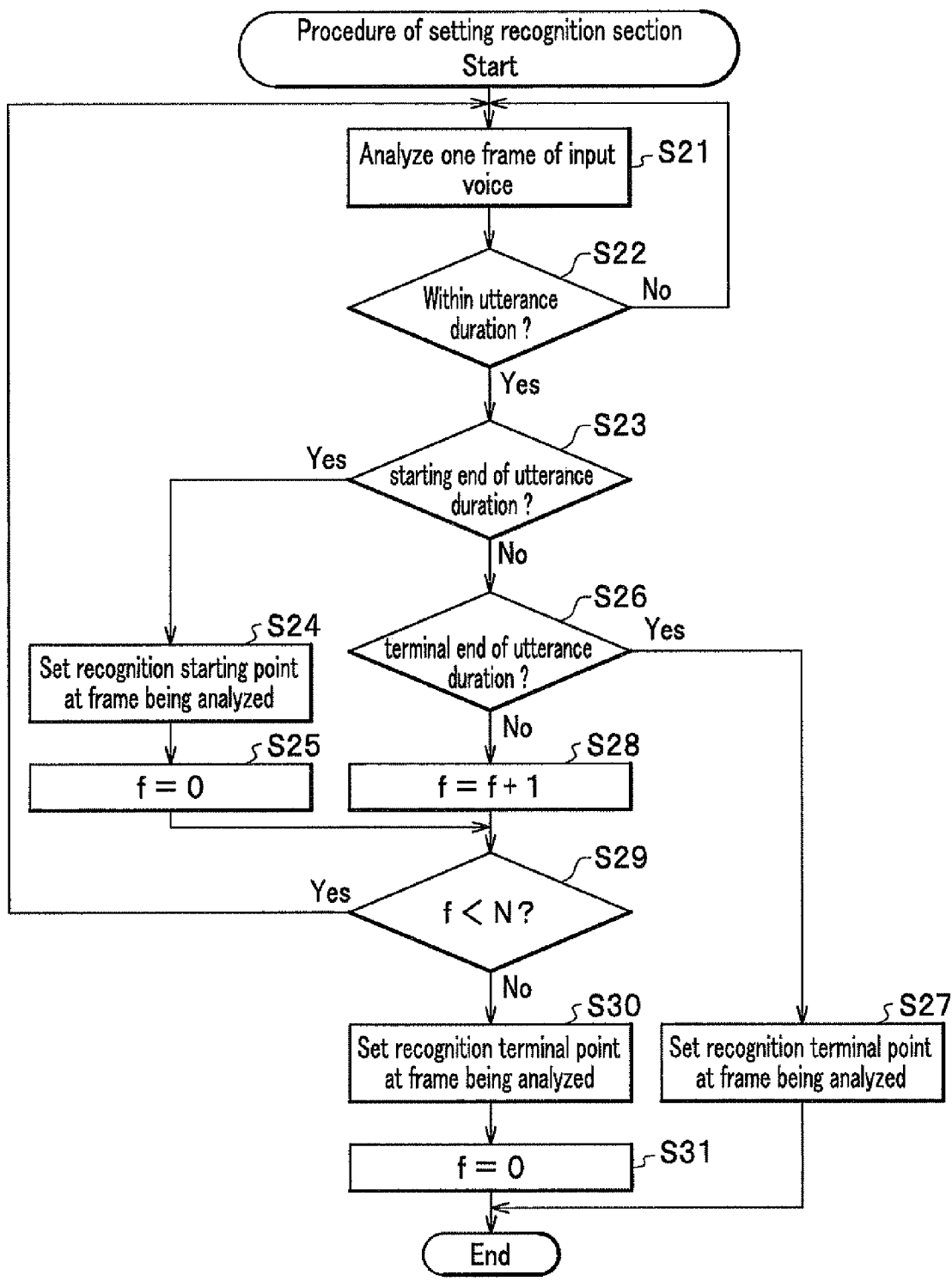
FIG. 7 is a flowchart showing a procedure of setting a recognition section in the operation of the interactive device according to the first embodiment of the present invention.

Hereinafter, with reference to FIG. 7, a brief description will be made of details of setting of a recognition section (step S2) in FIG. 6.

The interactive device 1 operates as follows. First, the voice analyzing unit 21 analyzes one frame of the input voice and converts it into a voice feature vector (step S21). Then, the recognition starting point setting unit 22 judges whether or not said one frame is within the user's utterance duration by using, for example, power information of the voice feature vector (step S22). If said one frame is within the user's utterance duration (YES in step 22), the procedure proceeds to step S23. If said one frame is not within the user's utterance duration (NO in step 22), the procedure returns to step S21.

Next, the recognition starting point setting unit 22 judges whether or not said one frame is at the starting end of the user's utterance duration by using, for example, the power information of the voice feature vector (step S23). Then, if said one frame is at the starting end of the user's utterance duration (YES in step S23), the recognition starting point setting unit 22 sets a recognition starting point at said frame being analyzed (step S24) and sets f=0 (step S25), and the procedure proceeds to step S29. Here, the "f" in step S25 refers to the number of frames from the recognition starting point to said frame being analyzed in the recognition section.

If said one frame is not at the starting end of the user's utterance duration (NO in step S23), the recognition terminal point updating unit 24 judges whether or not said one frame is at the terminal end of the user's utterance duration (step S26). If said one frame is at the terminal end of the user's utterance duration (YES in step S26), the recognition terminal point updating unit 24 sets a recognition terminal point at said frame being analyzed (step S27), and the procedure of setting a recognition section is ended.

On the other hand, if said one frame is not at the terminal end of the user's utterance duration (NO in step S26), f=f+1 is set (step S28) and whether or not f<N is judged (step S29).

Here, the "N" in step S29 is equivalent to a number of frames for the interval from the recognition starting point to the recognition terminal point determined by the recognition terminal point setting unit 23 (or by the recognition terminal point updating unit 24). The "N" in step 29 also is equivalent to the number of frames present in the "predetermined length of time" by which the recognition terminal point setting unit 23 sets the recognition terminal points apart from each other (by which the recognition terminal point updating unit 24 updates the recognition terminal points apart from each other).

If, for example, as mentioned earlier, one frame of the input voice has a length of 10 msec and the recognition terminal point setting unit 23 sets (the recognition terminal point updating unit 24 updates) the recognition terminal point by the interval of 200 msec, the "N" in step S29 is 20 (=200/10). Thus, the processing in step S29 includes counting the number of frames used by the recognition terminal point setting unit 23 to set the recognition terminal point (used by the recognition terminal point updating unit 24 to update the recognition terminal point).

If f<N is established (YES in step S29), the procedure returns to step S21. If f<N is not established (NO in step S29), the recognition terminal point setting unit 23 (the recognition terminal point updating unit 24) sets said frame being analyzed at the recognition terminal point (step S30), and sets f=0 (step S31), and the procedure of setting a recognition section is ended.

(Details of Updating of Recognition Starting Point (Step S7))

Figure 8:
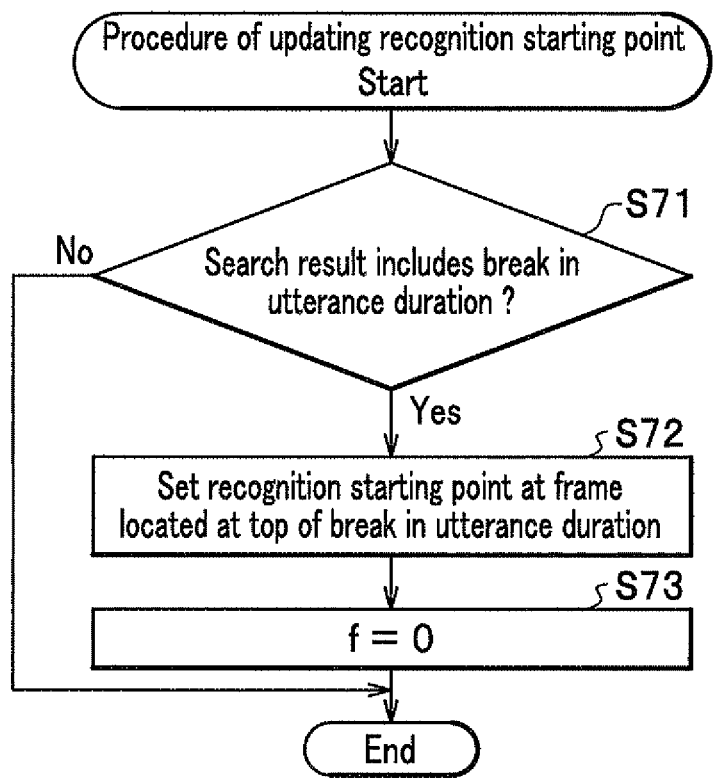
FIG. 8 is a flowchart showing a procedure of updating a recognition starting point in the operation of the interactive device according to the first embodiment of the present invention.

Hereinafter, with reference to FIG. 8, a brief description will be made of details of updating of a recognition starting point (step S7) in FIG. 6.

The interactive device 1 operates as follows. First, the recognition starting point updating unit 25 judges whether or not a search result by the second-path searching unit 32 includes a break in the user's utterance duration (step S71). If the search result by the second-path searching unit 32 includes a break in the user's utterance duration (YES in step S71), the recognition starting point updating unit 25 sets the recognition starting point at a frame located at the top of the break in the user's utterance duration (step S72), sets f=0 (step S73), and the procedure of updating the recognition starting point is ended. If the search result by the second-path searching unit 32 includes no break in user's utterance duration (NO in step S71), the procedure of updating a recognition starting point is ended.

(Details of Example of Procedure of Determining Response Action (Step S5))

Hereinafter, with reference to FIGS. 9A and 9B (FIGS. 4C and 5 where appropriate), a brief description will be made of details of an example of a procedure of determining a response action (step S5) in FIG. 6. In the following paragraphs, description will be made first of the procedure with reference to a flowchart of FIG. 9A and then of a specific example of the procedure with reference of FIG. 9B.

The interactive device 1 operates as follows. First, as shown in FIG. 9A, the response action determining means 40 acquires a search result (recognition result) produced by the second-path searching unit 32 (step S511), as mentioned in, for example, the "Example of recognition result at time of number of frames: 120 (See FIG. 4C)" in FIG. 9B.

Figures 9A, 9B:
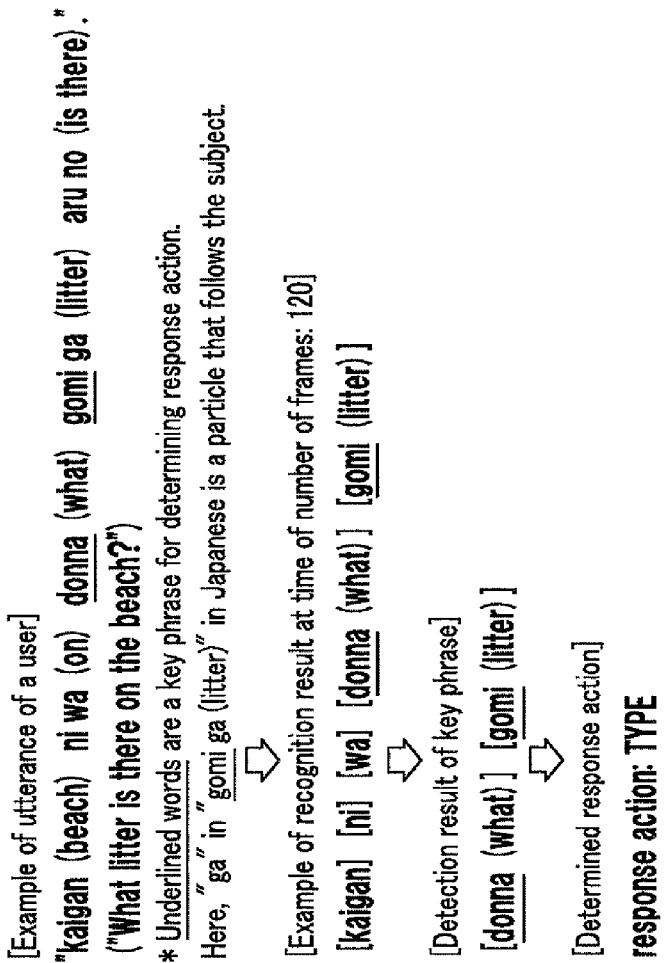
FIGS. 9A and 9B are views showing an example of a procedure of determining a response action in the operation of the interactive device according to the first embodiment of the present invention.

Next, as shown in FIG. 9A, the response action determining means 40 detects a key phrase from the result of the second-path search (step S512), as mentioned in, for example, the "Detection result of key phrase" in FIG. 9B.

Then, as shown in FIG. 9A, the response action determining means 40 determines a response action corresponding to the detected key phrase (step S513), and the procedure of determining a response action is ended. The response action is as shown in, for example, the "Determined response action" in FIG. 9B. Here, the "Determined response action" in FIG. 9B is a response action determined by the response action determining means 40 by referring to the above-mentioned table in FIG. 5.

(Details of Another Example of Procedure of Determining Response Action (step S5))

Hereinafter, with reference to FIGS. 10A and 10B (FIGS. 4C and 5 where appropriate), a brief description will be made of details of another example of a procedure of determining a response action (step S5) in FIG. 6. In the following paragraphs, description will be made first of the procedure with reference to a flowchart of FIG. 10A and then of a specific example of the procedure with reference of FIG. 10B.

The interactive device 1 operates as follows. First, as shown in FIG. 10A, the response action determining means 40 acquires a search result (recognition result) produced by the second-path searching unit 32 (step S521), as shown in, for example, the "Example of recognition result at time of number of frames: 120 (See FIG. 4C)" in FIG. 10B.

Next, as shown in FIG. 10A, the response action determining means 40 detects a key phrase from the result of the second-path search (step S522). Further, as shown in FIG. 10A, the response action determining means 40 judges whether or not the detected key phrase includes a last word "We" (step S523). If the detected key phrase includes the last word "We" (YES in step S523), the procedure proceeds to step S524. The key phrases are as shown in, for example, the "Detection result of key phrase" in FIG. 10B.

Then, as shown in FIG. 10A, the response action determining means 40 judges whether or not the last word "We" has a word reliability factor Se above a predetermined value α (step S524). As shown in FIGS. 10A and 10B, if the last word "We" has a word reliability factor Se above a predetermined value α (YES in step S524), the response action determining means 40 determines a response action corresponding to the last word "We", and the procedure of determining a response action is ended (step S525). On the other hand, as shown in FIGS. 10A and 10B, if the last word "We" has a word reliability factor Se below a predetermined value α (NO in step S524), the response action determining means 40 discards the last word "We" without regarding it as a key phrase, and the procedure of determining a response action is ended (step S526).

(Details of Example of Procedure of Executing Response Action (Step S6))

Figure 11:
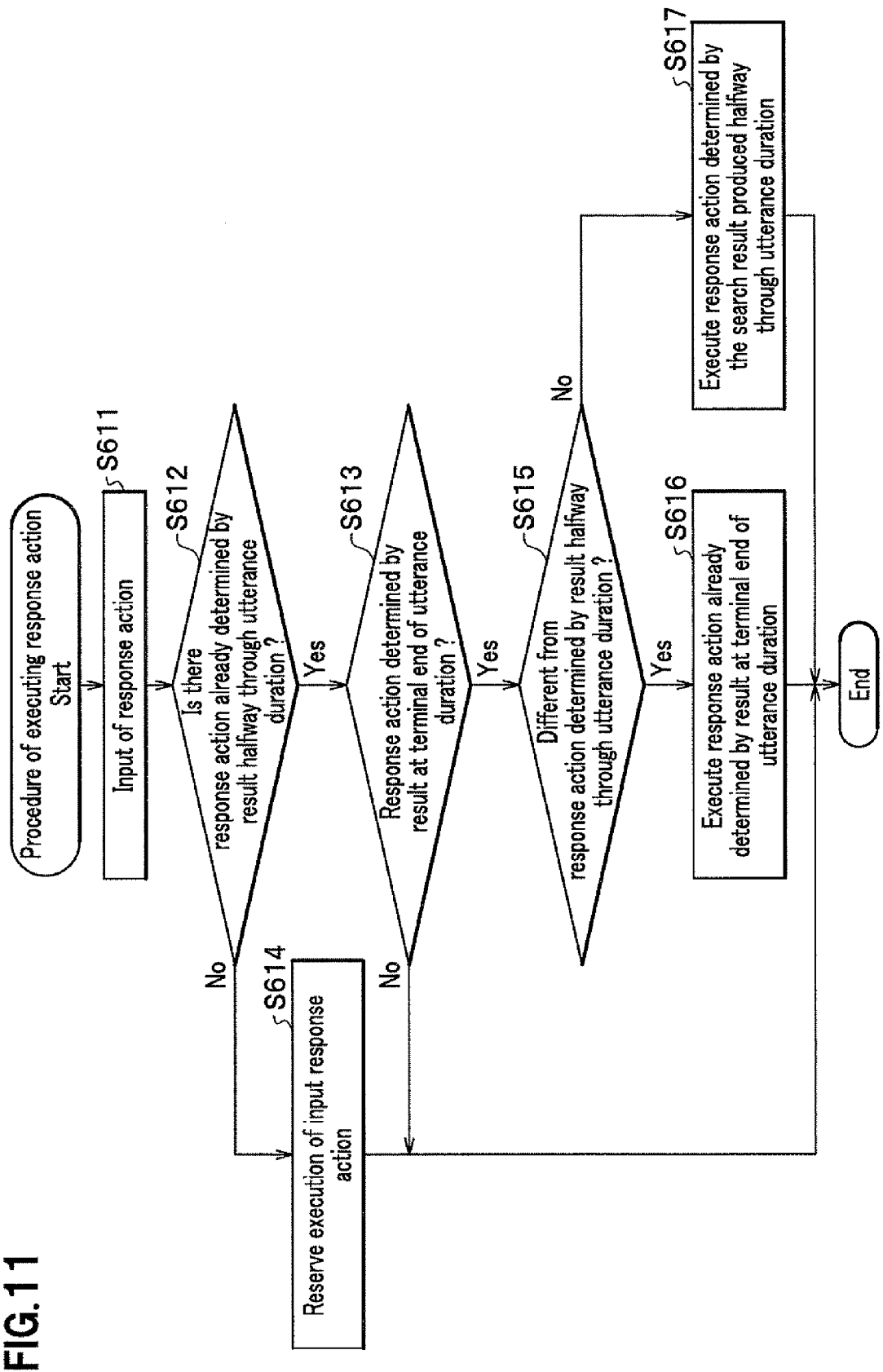
FIG. 11 is a flowchart showing an example of a procedure of executing a response action in the operation of the interactive device according to the first embodiment of the present invention.

Hereinafter, with reference to FIG. 11, a brief description will be made of details of an example of a procedure of executing a response action (step S6) in FIG. 6.

The interactive device 1 operates as follows. First, when a response action is input from the response action determining means 40 into the response action executing means 50 (step S611), the response action executing means 50 judges whether or not there is a response action already determined according to a search result halfway through the utterance duration (step S612). If there is a response action already determined according to a search result halfway through the utterance duration (YES in step S612), the procedure proceeds to step S613. On the other hand, if there is no response action already determined according to a search result halfway through the utterance duration (NO in step S612), the procedure proceeds to step S614. The response action executing means 50 schedules the input response action for execution (step S614), and the procedure of executing a response action is ended.

Next, the response action executing means 50 judges whether or not the response action input from the response action determining means 40 is a response action determined according to a recognition result produced at the terminal end of the utterance duration (step S613). If the response action input from the response action determining means 40 is a response action determined according to a recognition result produced at the terminal end of the utterance duration (YES in step S613), the procedure proceeds to step S615. On the other hand, if the response action input from the response action determining means 40 is not a response action determined according to a recognition result produced at the terminal end of the utterance duration (NO in step S613), the procedure of executing a response action is ended.

Next, the response action executing means 50 judges whether or not the response action input from the response action determining means 40 is different from a response action determined according to a recognition result produced halfway through the utterance duration (step S615). If the response action input from the response action determining means 40 is different from the response action determined according to the recognition result produced halfway through the utterance duration (YES in step S615), the response action determining means 40 executes the response action determined according to the recognition result produced at the terminal end of the utterance duration (step S616), and the procedure of executing a response action is ended. On the other hand, if the response action input from the response action determining means 40 is not different from the response action determined according to the recognition result produced halfway through the utterance duration (NO in step S615), the response action determining means 40 executes the response action determined according to the search result produced halfway through the utterance duration (step S617), and the procedure of executing a response action is ended.

(Details of Another Example of Procedure of Executing Response Action (Step S6))

Figure 12:
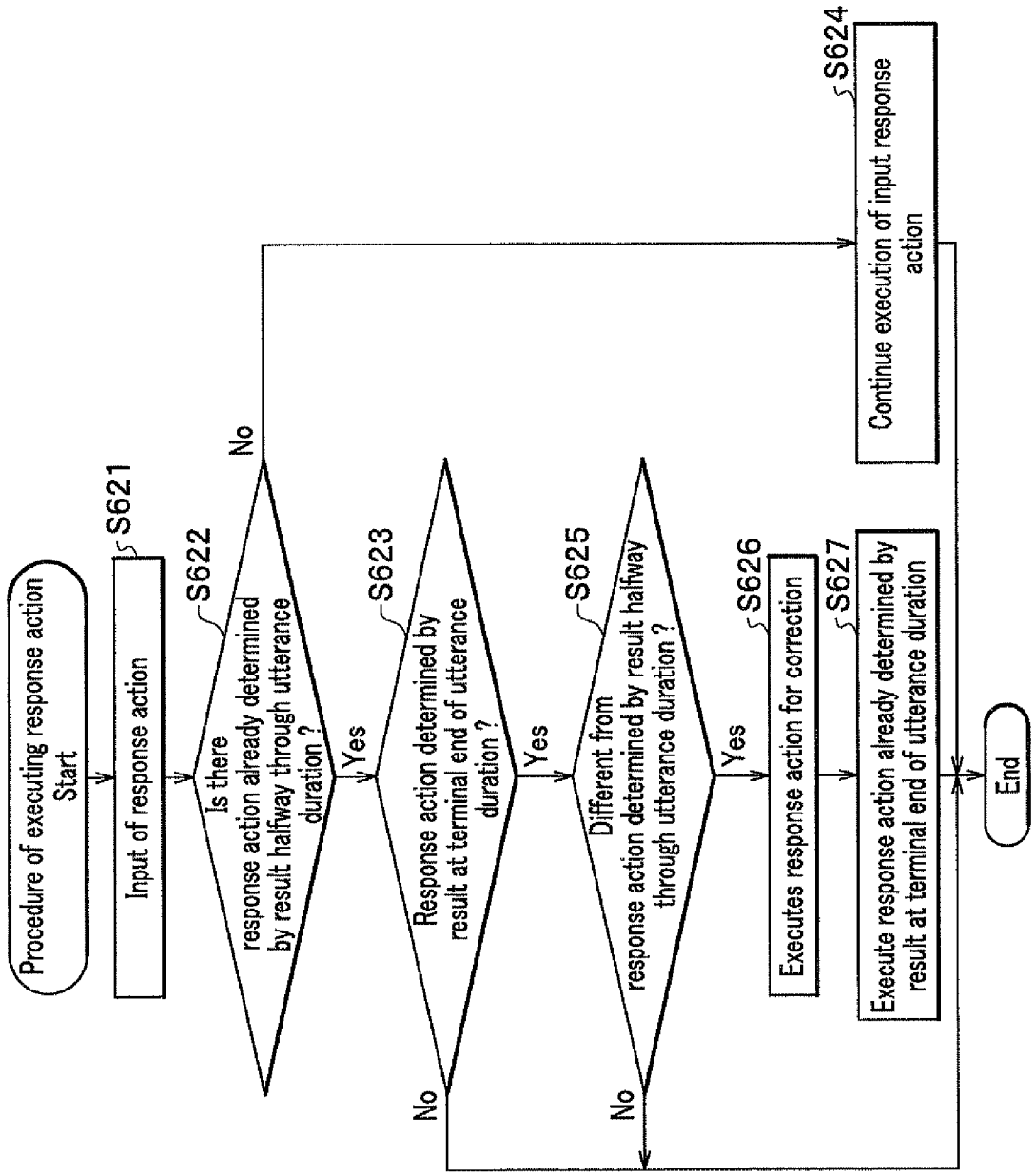
FIG. 12 is a flowchart showing another example of the procedure of executing a response action in the operation of the interactive device according to the first embodiment of the present invention.

Hereinafter, with reference to FIG. 12, a brief description will be made of details of an example of a procedure of executing a response action (step S6) in FIG. 6.

The interactive device 1 operates as follows. First, when a response action is input from the response action determining means 40 into the response action executing means 50 (step S621), the response action executing means 50 judges whether or not there is a response action already determined according to a search result halfway through the utterance duration (step S622). If there is a response action already determined according to a search result halfway through the utterance duration (YES in step S622), the procedure proceeds to step S623. On the other hand, if there is no response action already determined according to a search result halfway through the utterance duration (NO in step S622), the procedure proceeds to step S624 and the response action executing means 50 continues execution of the input response action (step S624), and the procedure of executing a response action is ended.

Next, the response action executing means 50 judges whether or not the response action input from the response action determining means 40 is a response action determined according to a recognition result produced at the terminal end of the utterance duration (step S623). If the response action input from the response action determining means 40 is a response action determined according to a recognition result produced at the terminal end of the utterance duration (YES in step S623), the procedure proceeds to step S625. On the other hand, the response action input from the response action determining means 40 is not a response action determined according to a recognition result produced at the terminal end of the utterance duration (NO in step S623), the procedure of executing a response action is ended.

Next, the response action executing means 50 judges whether or not the response action input from the response action determining means 40 is different from a response action determined according to a recognition result produced halfway through the utterance duration (step S625). If the response action input from the response action determining means 40 is different from the response action determined according to the recognition result produced halfway through the utterance duration (YES in step S625), the response action executing means 50 executes a response action for correction (step S626) and executes the response action determined according to the recognition result produced at the terminal end of the utterance duration (step S627), and the procedure of executing a response action is ended. On the other hand, if the response action input from the response action determining means 40 is not different from the response action determined according to the recognition result produced halfway through the utterance duration (NO in step S625), the procedure of executing a response action is ended.

Second Embodiment

Figure 13:
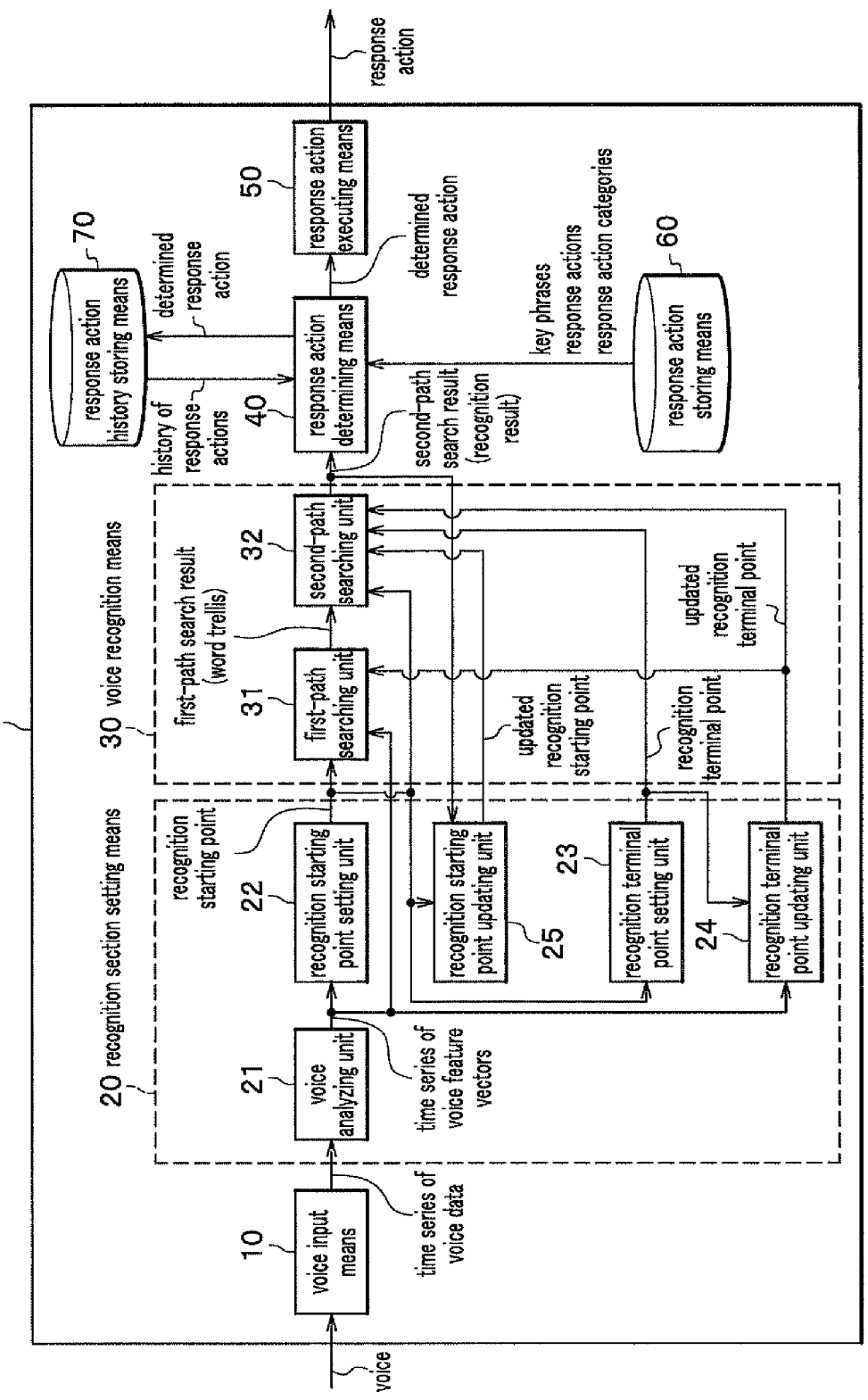
FIG. 13 is a block diagram showing in detail the configuration of an interactive device according to a second embodiment of the present invention.
Figure 16A:
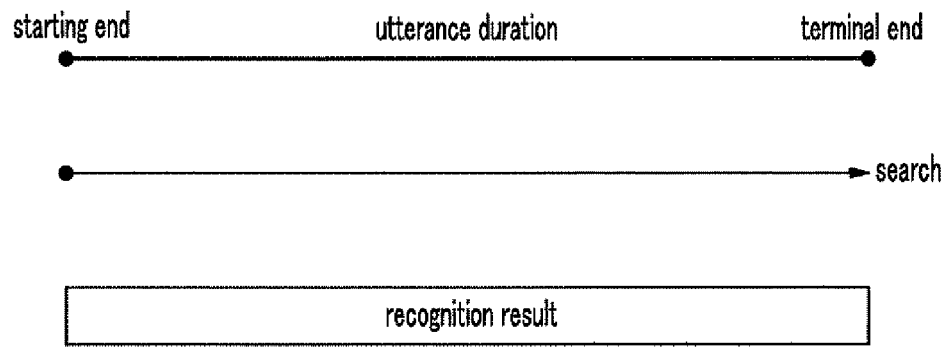
FIGS. 16A-16C are schematic views showing outlines of procedures of conventional searches.
Figure 16B:
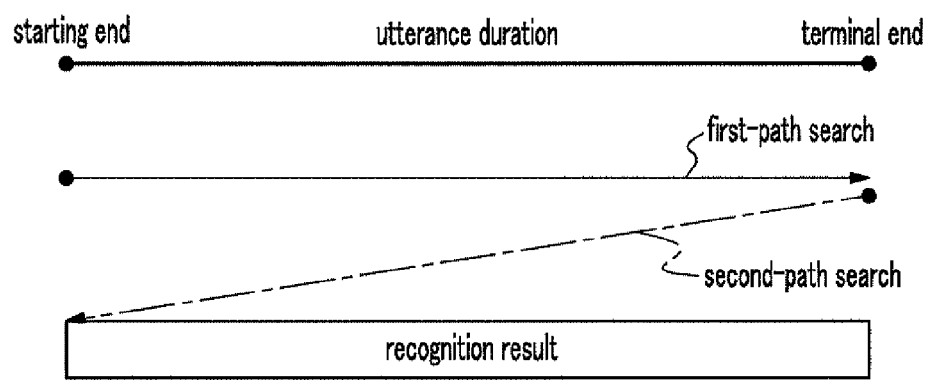
Figure 16C:
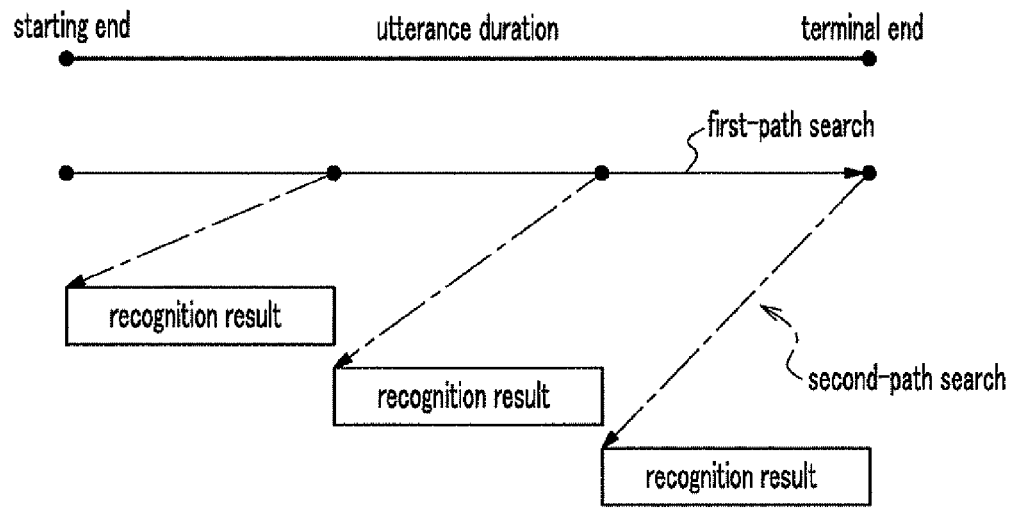

Hereinafter, brief descriptions will be made of an interactive device 1A according to a second embodiment of the present invention with reference to FIGS. 13 and 14. The interactive device 1A is the same as the interactive device 1 except that it further includes a response action storing means 60 and a response action history storing means 70, as shown in FIG. 13. In the following paragraphs, differences of the interactive device 1A from the interactive device 1 will be mainly described and details of the common configurations thereof with the interactive device 1 will be omitted.

The response action storing means 60 is for storing therein information on response actions determined by the response action determining means 40. The response action storing means 60 has stored therein a table of relations between key phrases, response actions corresponding to the key phrases, and response action categories serving as categories of the response actions, as shown in FIG. 14. The response action storing means 60 is configured to be capable of outputting the table to the response action determining means 40 upon necessity, as shown in FIG. 13. More specifically, the response action storing means 60 is embodied as a memory, a hard disc or the like that is capable of storing data therein.

The response action history storing means 70 is for storing a history of the response actions determined by the response action determining means 40. More specifically, the response action history storing means 70 has stored therein response actions determined by the response action determining means 40 in the form of a table. The response action history storing means 70 is configured to be capable of outputting those response actions to the response action determining means 40 upon necessity, as shown in FIG. 13. Further, the response action history storing means 70 receives sequentially the response actions determined by the response action determining means 40, as shown in FIG. 13. More specifically, the response action history storing means 70 is embodied as a memory, a hard disc or the like that is capable of storing data therein.

The interactive device 1A including the response action storing means 60 and the response action history storing means 70 performs the procedure of determining a response action in two stages. That is, the response action determining means 40 judges whether or not a last word (a last-word group) included in a result of a second-path search performed by the second-path searching unit 32 matches a key phrase. Simultaneously with this judgment, the response action determining means 40 judges whether or not a response action category of a response action determined currently by the response action determining means 40 and a response action category of a response action determined previously by the response action determining means 40 are the same. Then, only when the last word (the last-word group) included in the result of the second-path search performed by the second-path searching unit 32 matches the key phrase and the both categories are the same, the response action determining means 40 determines a response action corresponding to the key phrase.

For judging whether or not the response action category of the response action determined currently by the response action determining means 40 and the response action category of the response action determined previously by the response action determining means 40 are the same, the response action determining means 40 checks a history of the previously determined response action stored in the response action history storing means 70 by referring to the table stored in the response action storing means 60.

In the interactive device 1A configured as described above, the response action determining means 40 determines a response action only when the response action and currently determined response action belong to the same category as that of the previously determined response action. Consequently, the interactive device 1A is able to prevent determination of a response, which is based on a wrong search result produced by an error in a search by the second-path searching unit 32, and which is totally irrelevant to action according to an error a wrong search result by the second-path searching unit 32 that is not related with the previously determined response action.

[Operations of the Interactive Device 1A]

Hereinafter, a brief description will be made of an operation of the interactive device 1A according to the second embodiment with reference to FIG. 15. The interactive device 1A is the same in operation as the interactive device 1 except the procedure of determining a response action (step S5 in FIG. 6). Thus, in the following paragraphs, only the procedure of determining a response action by the interactive device 1A will be described. In the following paragraphs, description will be made first of the procedure with reference to a flowchart of FIG. 15A and then of a specific example of the procedure with reference of FIG. 15B.

First, as shown in FIG. 15A, the response action determining means 40 acquires a recognition result produced by the second-path searching unit 32 (step S531), as mentioned under the "Example of recognition result at time of number of frames: 120" in FIG. 15B.

Next, as shown in FIG. 15A, the response action determining means 40 detects a key phrase from the result of the second-path search (step S532). Further, as shown in FIG. 15A, the response action determining means 40 judges whether or not the detected key phrase includes a last word "We" (step S533). If the detected key phrase includes the last word "We" (YES in step S533), the procedure proceeds to step S534. The key phrases are as mentioned under the "Detection result of key phrase" in FIG. 15B. If the detected key phrase does not include the last word "We" (NO in step S533), the procedure proceeds to step S536.

Next, as shown in FIG. 15A, the response action determining means 40 temporarily determines a response action corresponding to the last word "We" (step S534). This leads to a result as mentioned under the "Temporarily determined response action and corresponding response action category" in, for example, FIG. 15B. Next, as shown in FIG. 15A, the response action determining means 40 judges whether or not the temporarily determined response action belongs to the previously determined response action category (step S535).

Then, as shown in FIG. 15A, if the temporarily determined response action belongs to the previously determined response action category (YES in step S535), the response action determining means 40 determines the temporarily determined response action (step S536). This leads to a result as mentioned under "If the previously determined response action category is REFUSAL" in FIG. 15B. On the other hand, as shown in FIG. 15A, if the temporarily determined response action does not belong to the previously determined response action category (NO in step S535), the response action determining means 40 does not regard the last word "We" as a key phrase, and discards the temporarily determined response action (step S537), and the procedure of determining a response action is ended. This leads to a result as mentioned under the "If the previously determined response action category is BEACH CLEANUP" in FIG. 15B. Next, the response action determined by the response action determining means 40 is stored in the response action history storing means 70 (step S538), and the procedure of determining a response action is ended.

[Interactive Program]

The interactive devices 1 and 1A may be realized by operating a conventional computer through a program that allows the conventional computer to function as the above means and units. The program may be distributed via a communication line or may be written in a recording medium such as a CD-ROM or the like and distributed.

In the above paragraphs, descriptions have been made of the interactive devices 1 and 1A according to the first and second embodiments of the present invention. However, the invention is not limited by any of the details of description, but rather is intended to be construed broadly, and changes and variations may be made without departing from the spirit and scope as set out in the claims.

For example, in the interactive devices 1 and 1A, voice is input from the outside through the voice input means 10 into the voice analyzing unit 21 where the voice as a time series voice data is converted into voice feature vectors, as described above. However, the voice analyzing unit 21 may be omitted and the voice input means 10 may convert the voice into voice feature vectors.

Further, in the interactive devices 1 and 1A, the response action determining means 40 is constituted to store, in the form of, for example, a table, data on a relation between key phrases serving as words expected to be included in recognition results produced by the second-path searching unit 32 of the voice recognition means 30 and response actions corresponding to those key phrases (See FIG. 5). However, an unillustrated external memory may be used to store the relation and the response action determining means 40 may be used to read out the data upon necessity.

What is claimed is:

1. An interactive device of that recognizes input voice of a user and thereby contents of utterance of the user and performs a predetermined response action corresponding to the recognized contents, the interactive device comprising:

a recognition section setting means that sets a recognition starting point to an utterance starting end frame serving as a starting end of the user's utterance in the input voice and sets a recognition terminal point to a frame which is a predetermined length of time ahead of the recognition starting point to thereby set a recognition section throughout which voice recognition is performed, a voice recognition means that performs voice recognition for the recognition section, a response action determining means that, if a recognition result by the voice recognition means includes a key phrase, determines a response action associated with the key phrase, and a response action executing means that executes the response action determined by the response action determining means, the recognition section setting means repeatedly updating the frame set as the recognition terminal point to a frame which is the predetermined length of time ahead of the recognition terminal point, to thereby set a plurality of recognition sections having different recognition terminal points, and the voice recognition means performing voice recognition on each of the plurality of recognition sections having different recognition terminal points, wherein the recognition section setting means comprises:

a recognition starting point setting unit that detects the utterance starting end frame and sets the recognition starting point at the detected utterance starting end frame, a recognition terminal point setting unit that sets the recognition terminal point at a frame which is the predetermined length of time ahead of the recognition starting point set by the recognition starting point setting unit; and a recognition terminal point updating unit that updates repeatedly the recognition terminal point set by the recognition terminal point setting unit to a frame which is the predetermined length of time ahead of the recognition terminal point, the recognition terminal point updating unit detects an utterance terminal end frame serving as a terminal end of the user's utterance in the input voice and updates the recognition terminal point to the detected utterance terminal end frame, said recognition terminal point being either one of the recognition terminal point set by the recognition terminal point setting unit and the recognition terminal point updated by the recognition terminal point updating unit, the voice recognition means comprises:

a first-path searching unit that searches word candidates in the user's utterance in a direction from the utterance starting end frame to the utterance terminal end frame, and a second-path search unit that searches the word candidates in each of the plurality of recognition sections having different recognition terminal points in a direction from the recognition terminal point to the recognition starting point according to a search result produced by the first-path searching unit, and the response action determining means determines, when a search result produced by the second-path search unit includes the key phase, the response action corresponding to the key phrase.

2. The interactive device of claim 1, wherein the recognition section setting means comprises a recognition starting point updating unit that, when the search result by the second-path search unit includes a break in the user's utterance, updates the recognition starting point set by the recognition starting point setting unit to a frame located at a top of the break in the user's utterance, and the second-path search unit searches the word candidates with respect to each of the plurality of recognition sections having different recognition starting points and different recognition terminal points.

3. The interactive device of claim 1, wherein the key phrase used in the determination of the response action is made up of a plurality of words.

4. The interactive device of claim 1, wherein the second-path searching unit calculates a word reliability factor indicative of a degree of plausibility of each of the searched word candidates, and the response action determining means determines, when the search result by the second-path searching unit includes the key phrase and when the word candidates corresponding to the key phrase have word reliability factors each above a predetermined value, the response action corresponding to the key phrase.

5. The interactive device of claim 1, wherein it further comprises:

a response action storing means that stores, in relation with each other, the key phrase, the response action corresponding to the key phrase, and a response action category serving as a category of the response action, and a response action history storing means that stores a history of response actions already determined by the response action determining means, wherein, when the search result by the second-path search unit includes the key phase, the response action determining means judges, by referring to the response action storing means and the response action history storing means, whether or not a response action category of a response action determined currently by the response action determining means and a response action category of a response action determined previously by the response action determining means are the same, and determines, when the both categories are the same, the response action corresponding to the key phrase.

6. The interactive device of claim 1, wherein, when a response action determined according to a last search result by the second-path search unit and a response action determined according to a previous search result by the second-path search unit are different, the response action executing means executes the response action determined according to the last search result.

7. The interactive device of claim 1, wherein, when a last search is performed by the second-path search unit after the start of an execution of a response action determined by the response action determining means and when a result of the last search and a result of a previous search corresponding to the response action currently being executed are different, the response action executing means cancels the response action currently being executed and executes a predetermined response action for correcting the response action currently being executed and then executes a response action determined by the response action determining means according to the last search result by the second-path search unit.

8. The interactive device of claim 2, wherein the key phrase used in the determination of the response action is made up of a plurality of words.

* * * * *